(12) United States Patent
Sejer et al.

(10) Patent No.: US 9,599,270 B2
(45) Date of Patent: Mar. 21, 2017

(54) END CLOSURE DEVICE

(71) Applicant: SCITEQ A/S, Hinnerup (DK)

(72) Inventors: Peter Sejer, Risskov (DK); Jesper Didriksen, Randers NØ (DK); René Kristensen, Hinnerup (DK)

(73) Assignee: SCITEQ A/S, Hinnerup (DK)

( * ) Notice: Subject to any disclaimer, the term of this patent is extended or adjusted under 35 U.S.C. 154(b) by 106 days.

(21) Appl. No.: 14/376,895

(22) PCT Filed: Feb. 6, 2013

(86) PCT No.: PCT/DK2013/050030
§ 371 (c)(1),
(2) Date: Aug. 6, 2014

(87) PCT Pub. No.: WO2013/117195
PCT Pub. Date: Aug. 15, 2013

(65) Prior Publication Data
US 2015/0000779 A1 Jan. 1, 2015

(30) Foreign Application Priority Data
Feb. 6, 2012 (DK) .......................... PA 2012 70057

(51) Int. Cl.
*F16L 55/10* (2006.01)
*F16L 57/00* (2006.01)
(Continued)

(52) U.S. Cl.
CPC .......... *F16L 55/115* (2013.01); *F16L 23/032* (2013.01); *F16L 23/036* (2013.01); *F16L 55/1157* (2013.01)

(58) Field of Classification Search
USPC ................................. 138/90, 96 R
See application file for complete search history.

(56) References Cited

U.S. PATENT DOCUMENTS 1,593,041 A    7/1926   Stewart
2,166,412 A    7/1939   Kiesel
(Continued)

FOREIGN PATENT DOCUMENTS

DE        38 33 535 A1   4/1990
FR          2 859 009 A1   2/2005
WO   WO 2010/034823 A1   4/2010

OTHER PUBLICATIONS

EPO, International Search Report for International Application No. PCT/DK2013/050030, completed Apr. 12, 2013.
(Continued)

*Primary Examiner* — Paul R Durand
*Assistant Examiner* — Vishal Pancholi
(74) *Attorney, Agent, or Firm* — Barclay Damon, LLP

(57) ABSTRACT

An end closure device (2) adapted to be used in connection with internal hydrostatic pressure testing of polymer tubes and comprising a mainly dome-shaped end cap (4) provided with sealing means for establishing a pressure-proof connection with opposite end parts of a sample (6) of the tube to be tested, an exterior ring-shaped part (14) of said dome-shaped end cap (4) being adapted to be connected with at least one or more squeezing parts (10) adapted to be assembled around said opposite end parts of said sample (6) of said tube to be tested, where said one or more squeezing parts (10) each being built-up of a number of piled up and interconnected plate elements (16) the configuration of each of which being provided by a cutting operation such as laser cutting or water cutting. By the concept of the present invention it becomes possible to vary both the internal configuration and the thickness of the piled-up plate members forming at least the squeezing parts of the end closure device. In other words it would be possible to built-up (Continued)

squeezing parts with any possible internal configuration without using milling tool operations or machining at all.

20 Claims, 22 Drawing Sheets

(51) Int. Cl.
*F16L 55/115* (2006.01)
*F16L 23/032* (2006.01)
*F16L 23/036* (2006.01)

(56) References Cited

U.S. PATENT DOCUMENTS

| | | | |
|---|---|---|---|
| 4,077,250 A | | 3/1978 | Wesch |
| 4,237,936 A * | | 12/1980 | Lollis .................... G01M 3/005 |
| | | | 138/90 |
| 5,074,336 A | | 12/1991 | Black |
| 5,468,025 A | | 11/1995 | Adinolfe et al. |
| 7,134,454 B2 * | | 11/2006 | Montminy .......... F16L 55/1157 |
| | | | 138/89 |
| 2008/0092977 A1 * | | 4/2008 | Zeyfang ................ F16L 55/115 |
| | | | 138/96 R |
| 2008/0093847 A1 | | 4/2008 | Sundholm |
| 2011/0011480 A1 * | | 1/2011 | Vachon ............... F16L 55/1157 |
| | | | 138/89 |

OTHER PUBLICATIONS

EPO (ISA/EP) Written Opinion of the International Searching Authority for International Application No. PCT/DK2013/050030).

* cited by examiner

A-A

30

END CLOSURE DEVICE

CROSS REFERENCE TO RELATED APPLICATIONS

This application is a national stage application pursuant to 35 U.S.C. §371 of International Application No. PCT/DK2013/050030, filed on Feb. 6, 2013, which claims priority to, and the benefit of, Danish Patent Application No. PA 2012 70057, filed on Feb. 6, 2012. The entire contents of such applications are hereby incorporated herein by reference.

FIELD OF THE INVENTION

The present invention relates to an end closure device adapted to be used in connection with internal hydrostatic pressure testing of polymer tubes and of the type indicated in the preamble of claim 1.

BACKGROUND OF THE INVENTION

When performing internal hydrostatic pressure tests of polymer tubes use is made of special end closures, which are mounted at opposite ends of a sample of the actual polymer tube in order to seal of the sample to be tested. One of the end closures is a so-called blind end closure part provided only with an air escape valve, while the opposite end closures is provided with an inlet valve system adapted to connect the testing tube sample with an external pressure testing equipment station during the internal hydrostatic pressure test. The pressure station is started while said air escape valve is open, when the sample is completely aired out, the test can be started.

Known end closures of the art in question are normally produces from moulded items by milling into the correct configuration and dimensions. Most often such end closures are divided into two or more parts being adapted to mount by assembling around opposite ends of the tube to be tested.

When it comes to very large end closures they are normally made by a moulded item made from an alloy of aluminium and bronze, which means that end closures for very large tubes having a diameter in the range of 2000-2500 mm are very heavy and very expensive to produce and indeed very difficult to handle and transport.

OBJECT OF THE INVENTION

On that background it is the present invention has for its purpose to provide a new and improved end closure device of the art in question by means of which the above mentioned disadvantages by known end closures devices by simple provisions are met and other important advantages may be achieved.

DESCRIPTION OF THE INVENTION

The end closure device according to the invention is characterised in, that said one or more squeezing parts each being built-up of a number of piled up and interconnected plate elements the configuration of each of which being provided by a cutting operation such as laser cutting or water cutting. By simple provisions the above mentioned disadvantages by known end closures devices are met and other important advantages may be achieved as well.

Appropriately, the end closure device according to the invention may be such provided that said one or more squeezing parts comprise external, radial connection means consisting of plate elements the configuration of which being provided by a cutting operation such as laser or water cutting.

In order to ensure a simple and quick production the end closure device according to the invention may be such provided that said interconnecting of piled up plate elements being provided by spot welding of the respective plate elements to connection rods or the like extending through the pile.

And in order to further support a quick and effective production the end closure device according to the invention may advantageously be such provided that said exterior ring-shaped part of said dome-shaped end cap being connected with one or more squeezing parts by means of external, radial connection means consisting of plate elements the configuration of which being provided by a cutting operation such as laser or water cutting.

It may be appropriate to modify the end closure device according to the invention such that said one or more squeezing parts comprising axially extending connecting members adapted to connect the mainly dome-shaped end cap to the squeezing parts after the latter have been mounted around the opposite ends of the tube to be tested.

And in order to ensure proper skid-proof connection between the respective parts the end closure device according to the invention may be such provided that one or more plate elements forming the piled up plate elements of said one or more squeezing parts at internal edges being provided with inwardly projecting tooth adapted to ensure skid-proof connection between the squeezing parts and the outside wall of the tube sample.

The end closure device according to the invention may be such provided that said one or more squeezing parts being provided into three parts each of which extend through 120° and consist three radial arranged pairs of assembling flanges.

Or the end closure device according to the invention may be such provided that said one or more squeezing parts being provided into four parts each of which extend through 90° and consist four radial arranged pairs of assembling flanges.

Alternatively the end closure device according to the invention may be such provided that said one or more squeezing parts being provided into two parts each of which extend through 180° and consist two radial arranged pairs of assembling flanges.

Preferably the end closure device according to the invention being such provided that each of said piled up and interconnected plate elements and each of said external, radial connection means consist of stainless steel plate.

DESCRIPTION OF THE DRAWING

In the following the invention is explained in more details with reference to the accompanying drawing, in which.

DETAILED DESCRIPTION OF THE INVENTION

Figure 1:
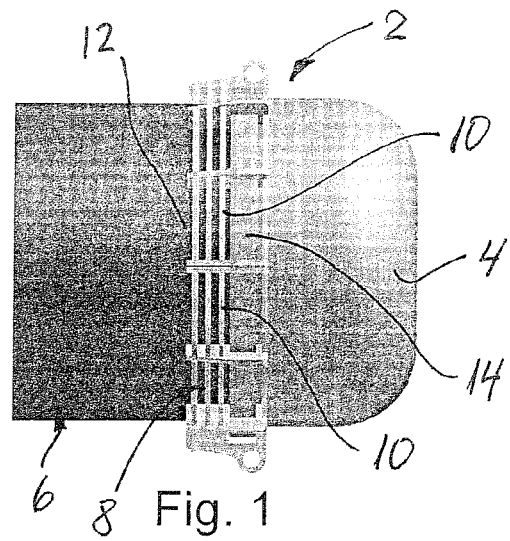
FIG. 1 shows a plane view of an embodiment for an end closure device according to the invention—mounted at an end of a polymer tube sample.
Figure 2:
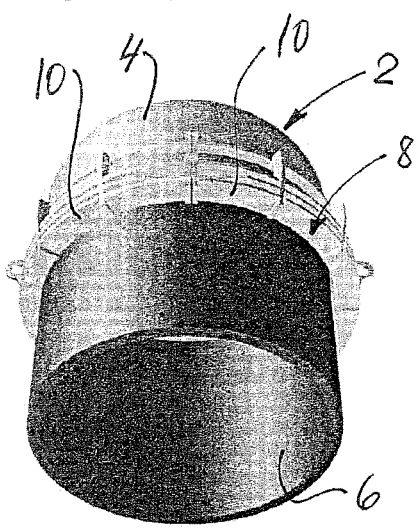
FIG. 2 shows a perspective view of the end closure device shown in FIG. 1—as seen from an open end of the tube sample.
Figure 3:
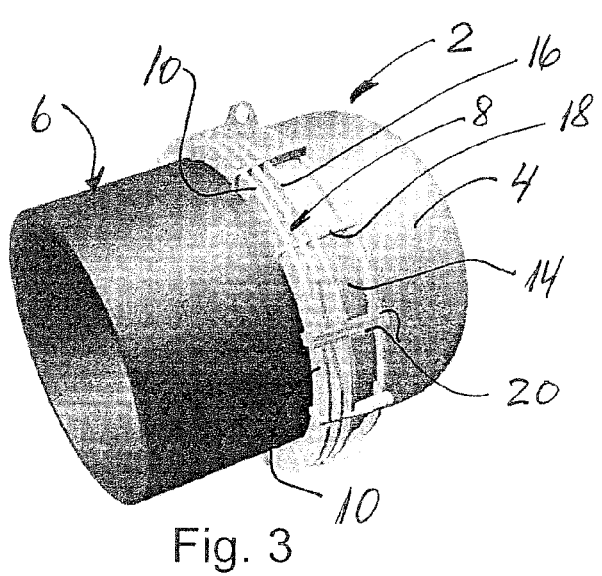
FIG. 3 shows a perspective view of the end closure device shown in FIG. 1—as seen from another angle of said open end of the tube sample.

In FIGS. 1-3 is shown an embodiment for an end closure device 2 according to the invention comprising a dome-shaped end cap 4, a tube sample 6 and a squeezing part 8 divided into two parts 10 each extending through 180° around an end part 12 of the tube sample 6 and a collar part 14 of the dome-shaped end cap 4.

Each of the squeezing parts 10 consists of a number of interconnected plate elements 16, which in this embodiment are placed with some internal distance and held together by means of external, radial connection means 18 and radial connection flanges 20 at the opposite ends of each 180° parts 10. Said external, radial connection means 18 also extends axially at the outside of said collar part 14 and abut with this in order to hold the dome-shaped end cap 4 in position in relation to the squeezing parts 10.

Figure 4:
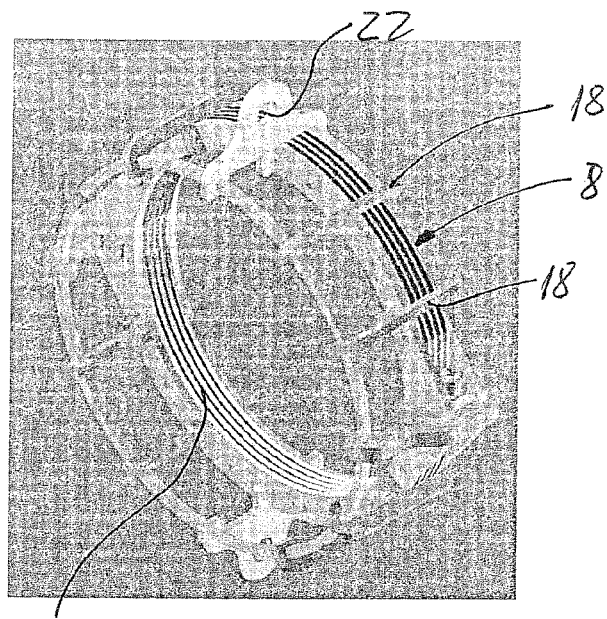
FIG. 4 shows a perspective view of another embodiment for the squeezing parts of an end closure device according to the invention.
Figure 5:
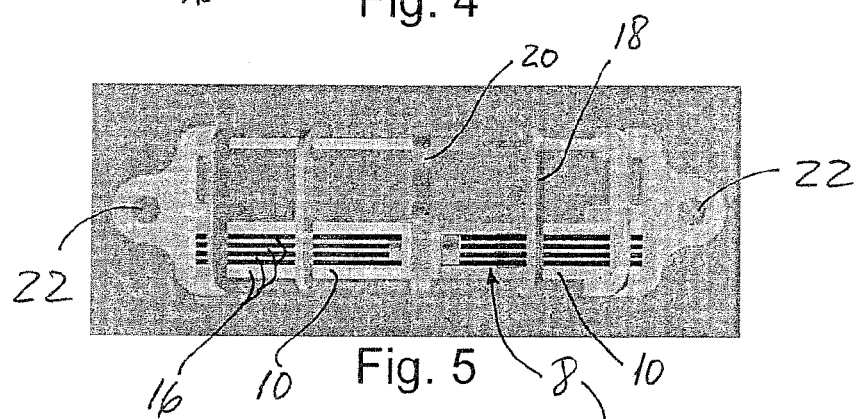
FIG. 5 shows a plane view of the squeezing parts of an end closure device shown in FIG. 4—as seen from one side thereof.
Figure 6:
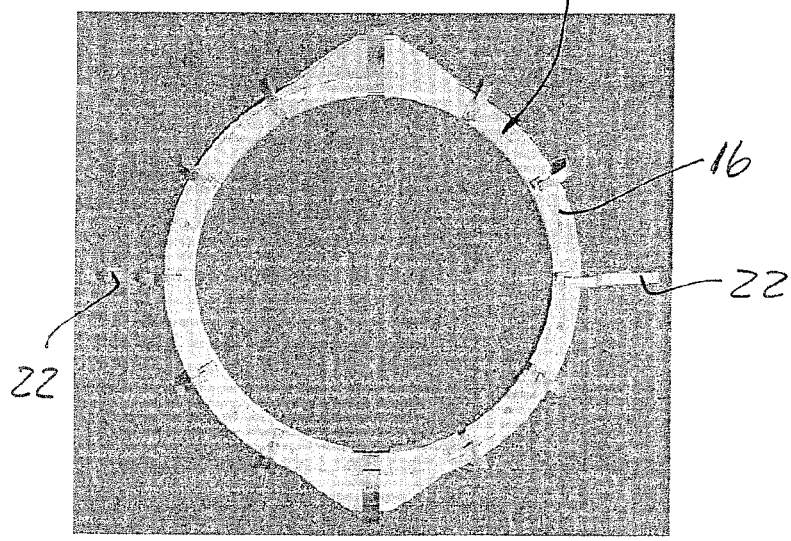
FIG. 6 shows a plane view of the squeezing parts of an end closure device shown in FIG. 4—as seen from one end thereof.
Figure 7:
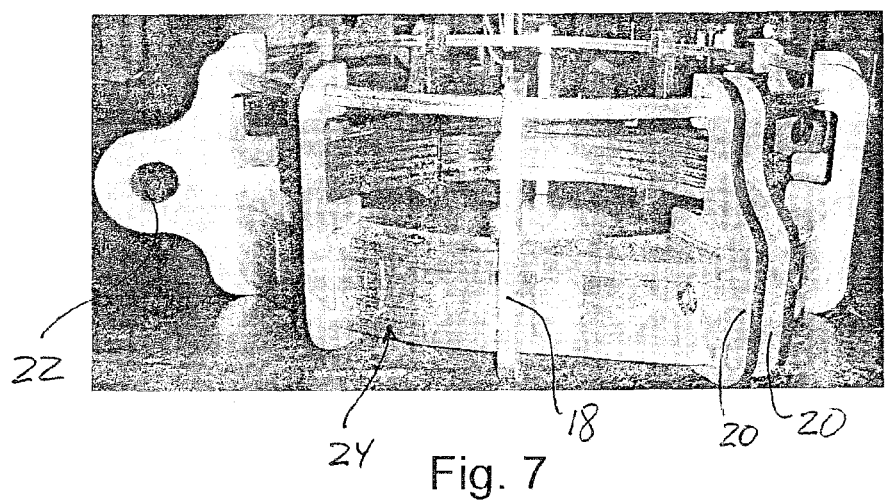
FIG. 7 shows a perspective view of another embodiment for the squeezing part of a very large end closure device according to the invention.
Figure 8:
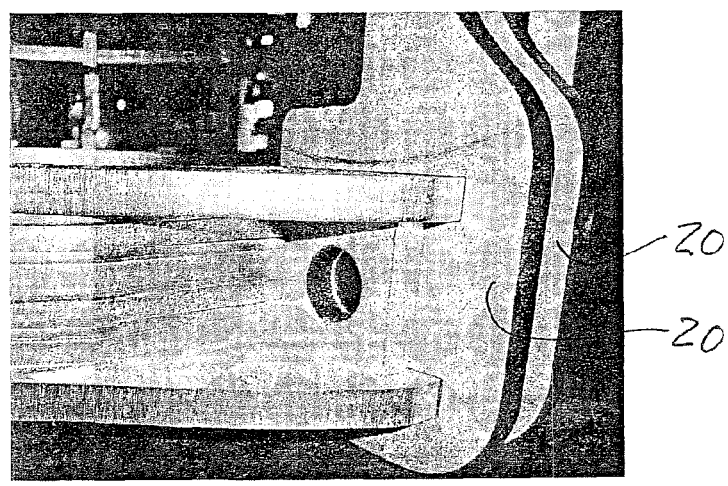
FIG. 8 shows a perspective view of details of the assembling parts of the squeezing parts shown in FIG. 7.
Figure 9:
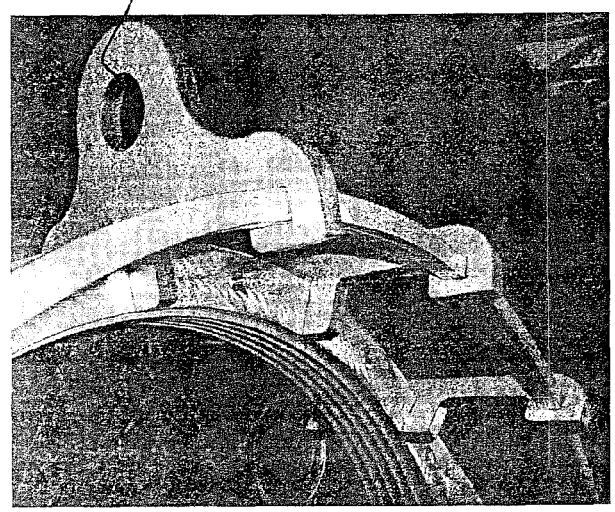
FIG. 9 shows a perspective view showing other details of the squeezing parts shown in FIG. 7.
Figure 10:
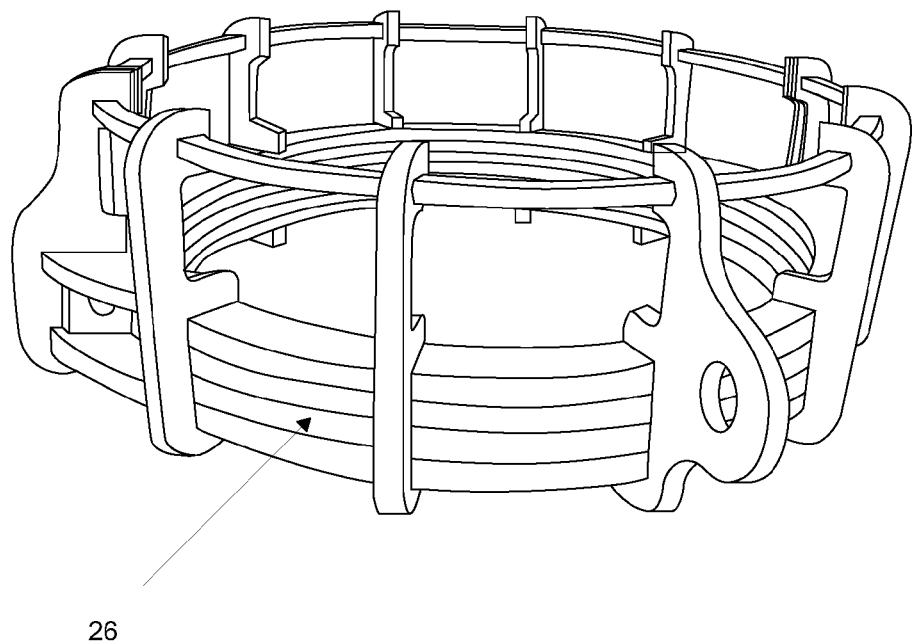
FIG. 10 shows a perspective view of the squeezing parts of a very large end closure device similar to that shown in FIG. 7.
Figure 11:
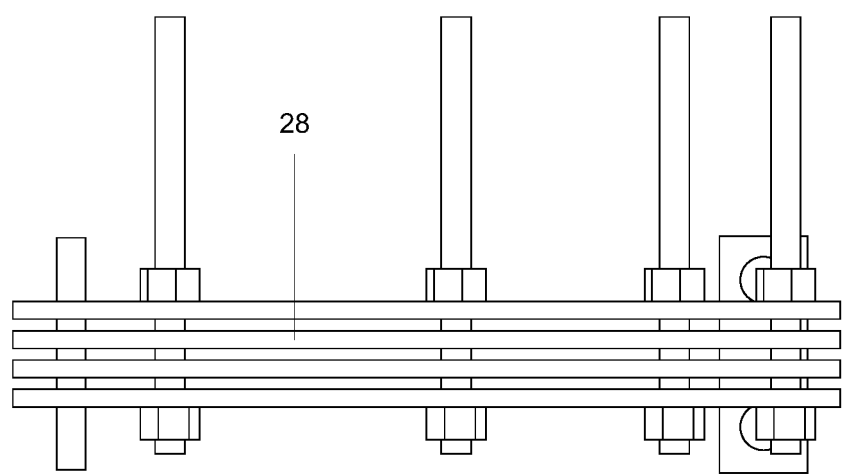
FIG. 11 shows a plane partial view of another embodiment for the squeezing parts of an end closure device according to the invention—as seen from an external side thereof.
Figure 12:
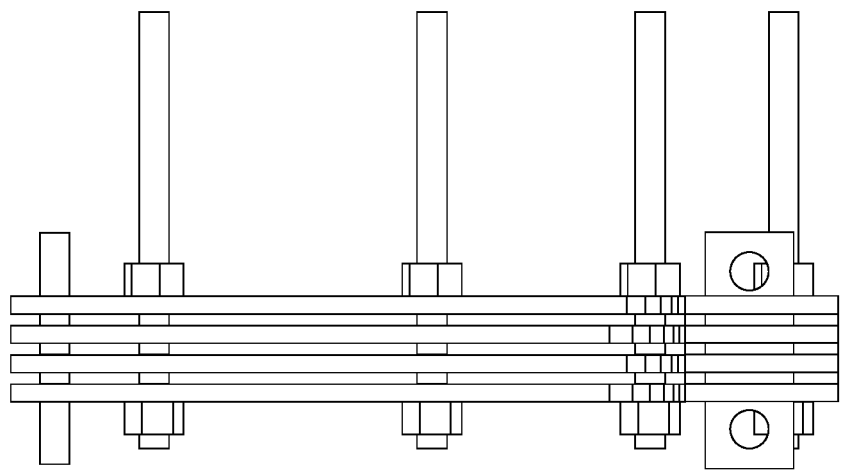
FIG. 12 shows a plane partial view of another embodiment for the squeezing parts of an end closure device according to the invention—as seen from an internal side thereof.
Figure 13:
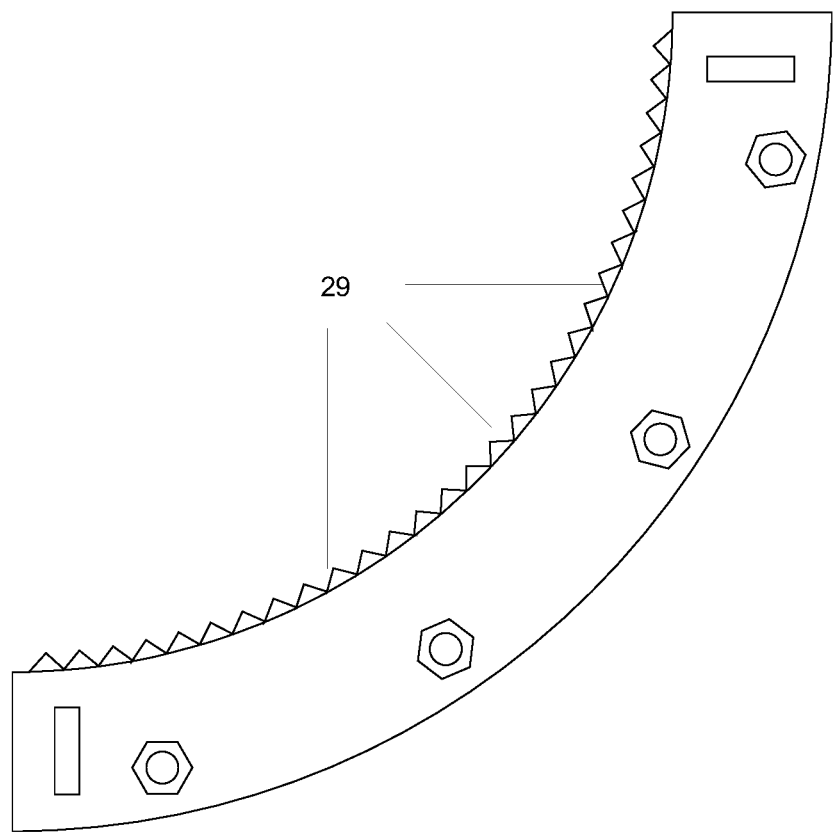
FIG. 13 shows a plane end view of the squeezing parts shown in FIGS. 11 and 12.
Figure 14:
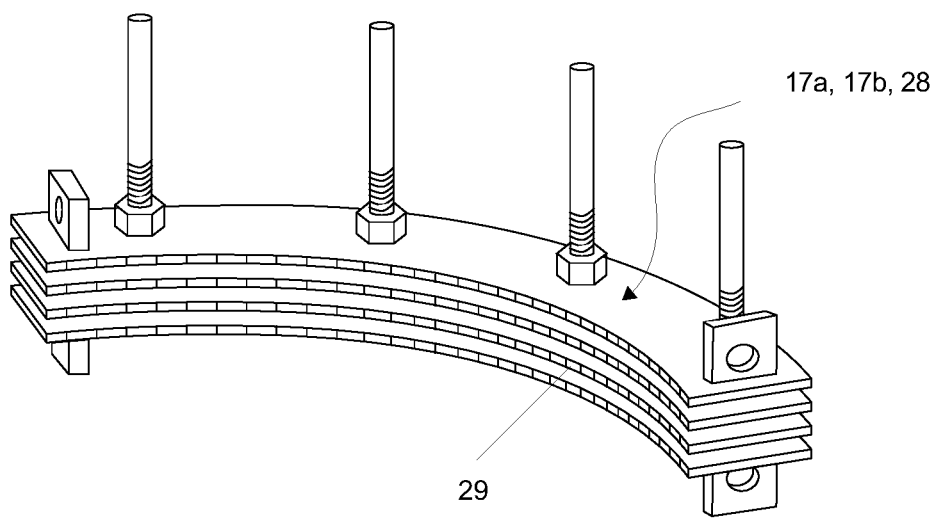
FIG. 14 shows a perspective view of the squeezing parts shown in FIGS. 11, 12 and 13.
Figure 15:
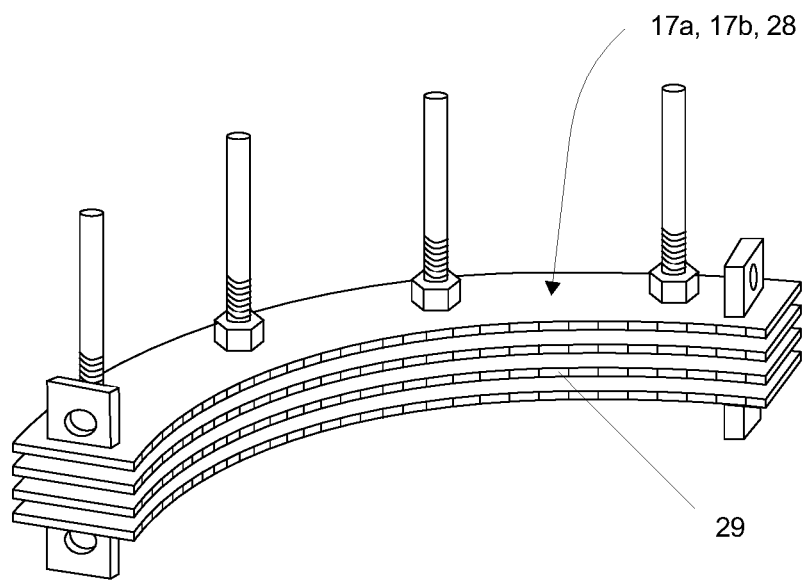
FIG. 15 shows a perspective view of the squeezing parts shown in FIGS. 11-14—but seen from another angle.

Most of the same parts are shown in FIGS. 4-6 showing a squeezing part 8 comprising two 180° squeezing parts 10 with radial connection flanges 20 and external, radial connection means 18. At the middle of each squeezing parts 10 being arranged lifting eyes 22 adapted for use when handling the squeezing parts 10 by means of a crane or other lifting aggregate. Squeezing part 8 defines an opening 9 (FIG. 4) configured to receive a portion (e.g., collar part 14) of the dome-shaped end cap 4 (FIG. 1). Depending upon the embodiment, the ring or plate element 17 (FIG. 4) of squeezing part 8 can define opening 9, or a group of plate elements 17a, 17b (FIG. 4) of squeezing part 8 can be arranged together to define opening 9.

In FIGS. 7-10 is shown a possible larger squeezing part 24 consisting of two squeezing parts 26 built-up similar to that of the squeezing parts 10 (FIGS. 4-6) except from the fact that the squeezing parts 26 are made without internal distances between the respective plate elements forming the piled-up squeezing parts 26. As seen most clearly in FIGS. 7, 9 and 10 the every second of the plate layers of the piled-up squeezing parts have minor internal diameter, whereby there in every second layer is established projecting edges to improve skid-proof contact between the outside wall of a tube sample and the internal side of the respective squeezing parts 26.

FIGS. 11-15 show still another embodiment of a 45° squeezing part 17a, 17b, 28 where some of the plate elements of the piled-up plate elements at the internal edges are provided with tooth 29 to improve skid-proof contact with the outside wall of a tube sample.

Figure 16:
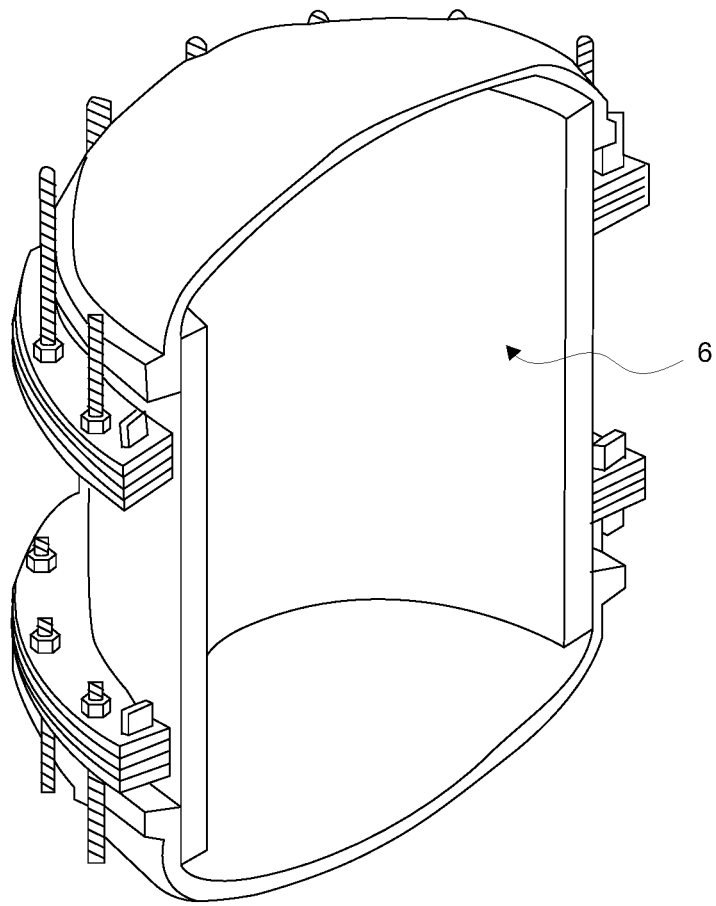
FIG. 16 shows a perspective view of a cut through assemble of a tube sample and opposite end closure devices according to the invention.
Figure 17:
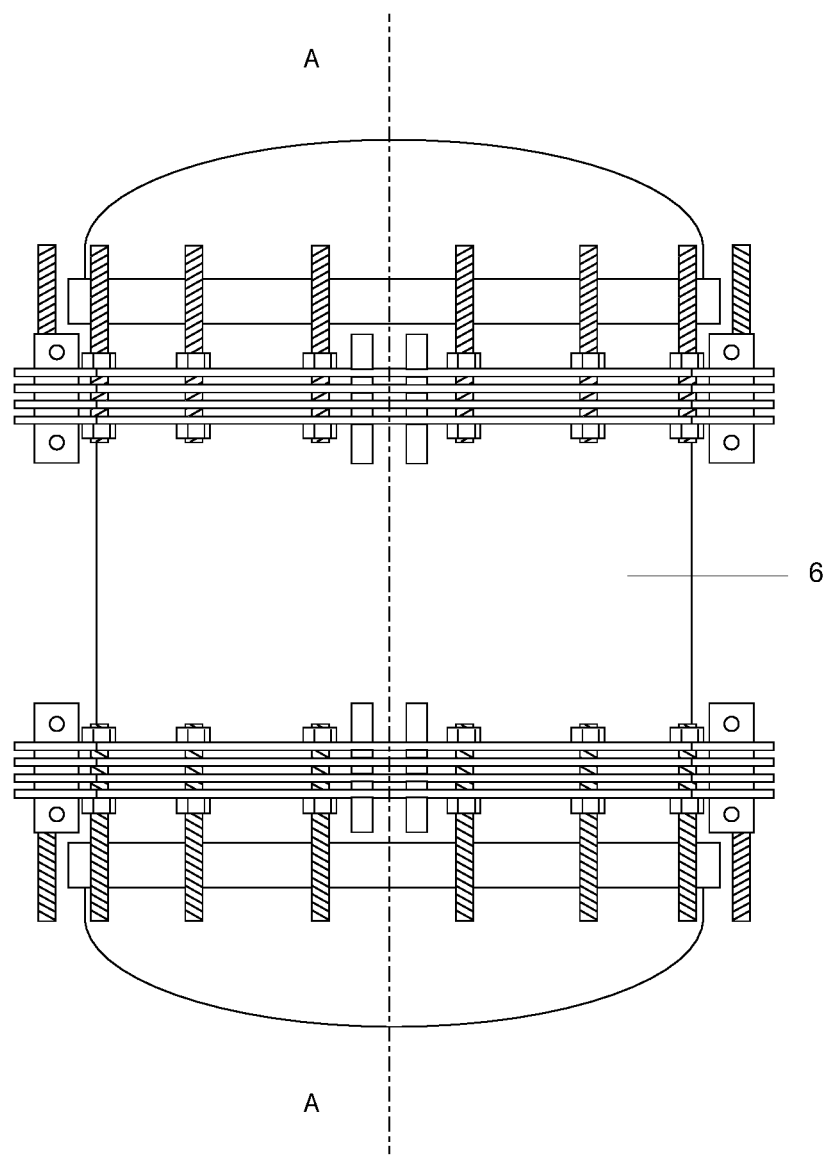
FIG. 17 shows a plane view of an assemble of a tube sample and end closure devices according to the invention.
Figure 18:
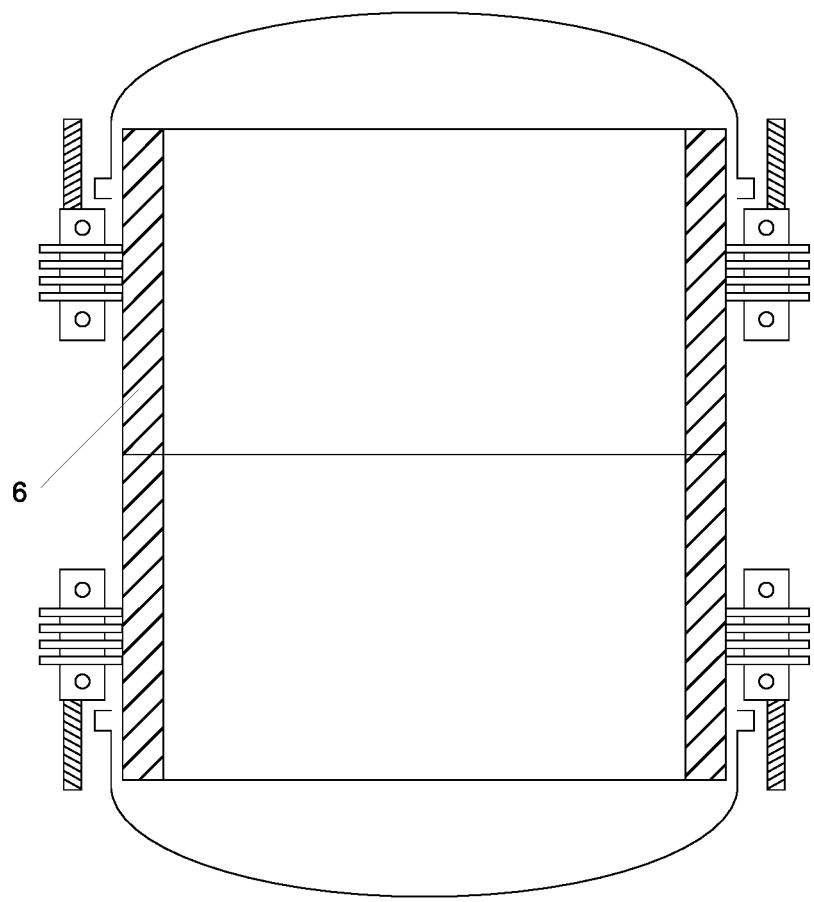
FIG. 18 shows a plane sectional view through the assemble shown in FIG. 17.
Figure 19:
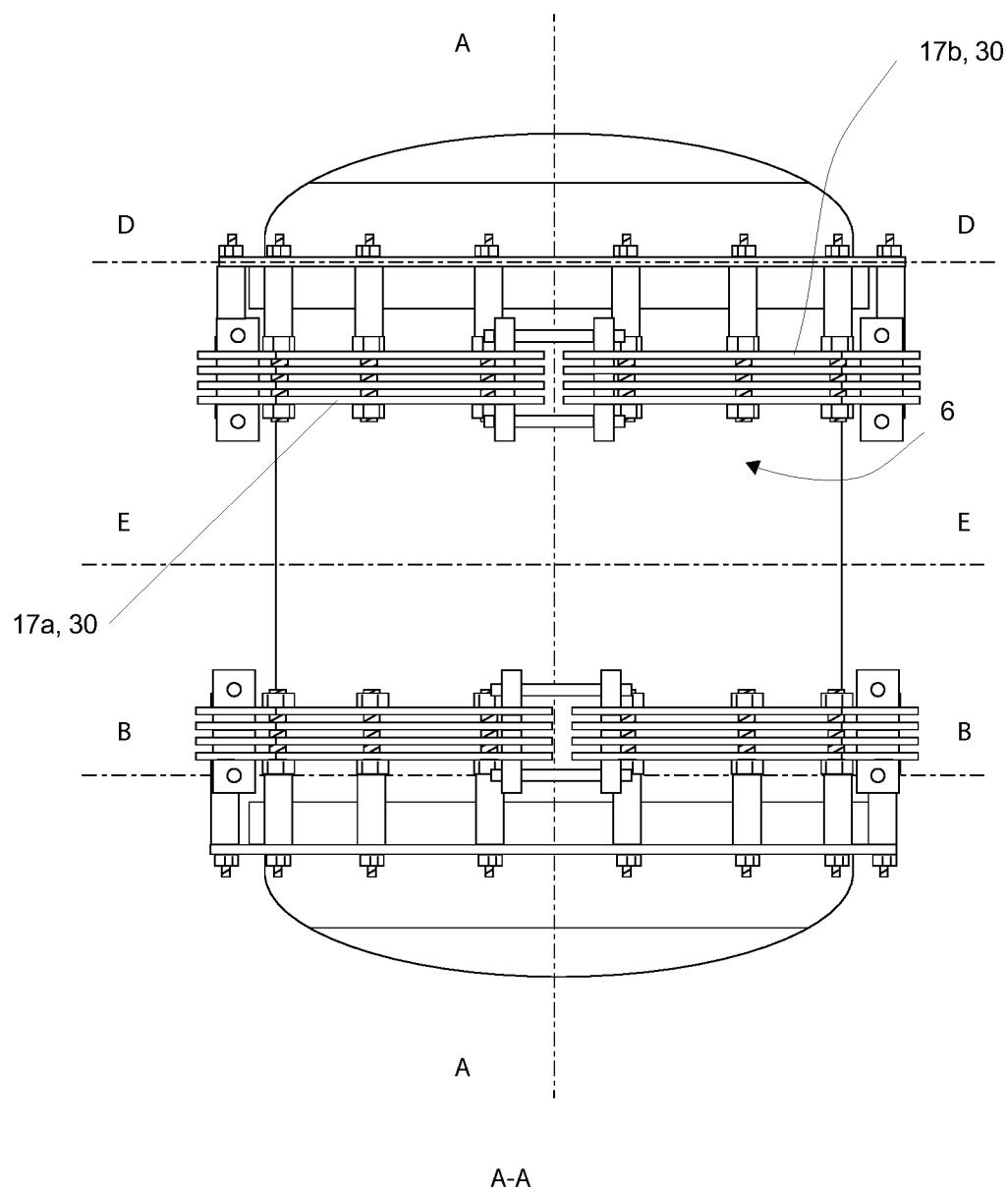
FIG. 19 shows a plane view of an assemble of a tube sample and modified end closure devices according to the invention.
Figure 20:
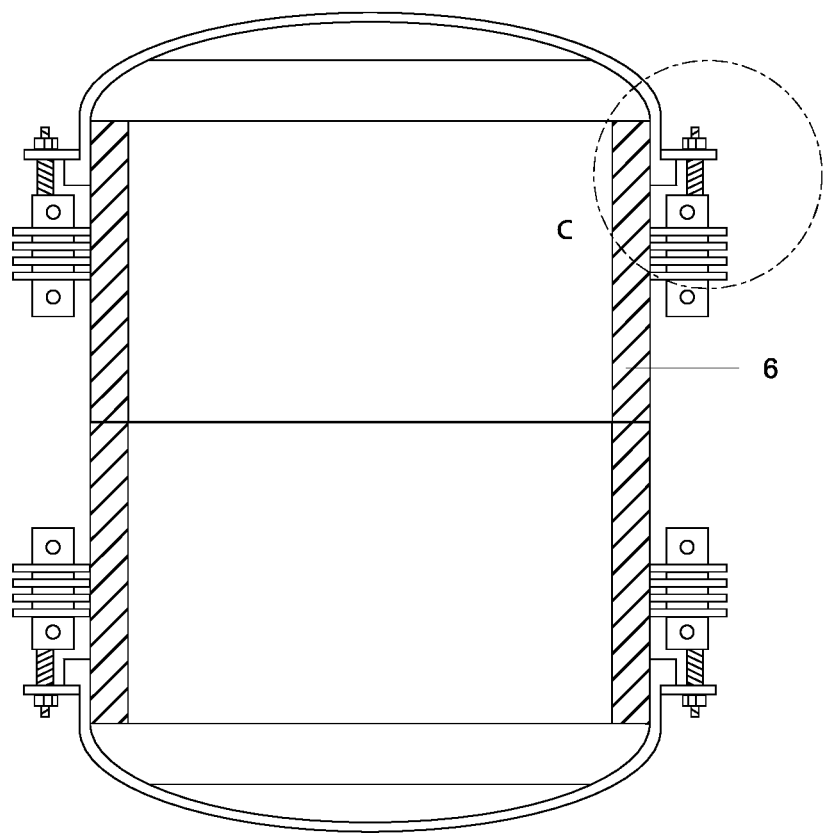
FIG. 20 shows a plane sectional view of the modified assemble shown in FIG. 19.
Figure 21:
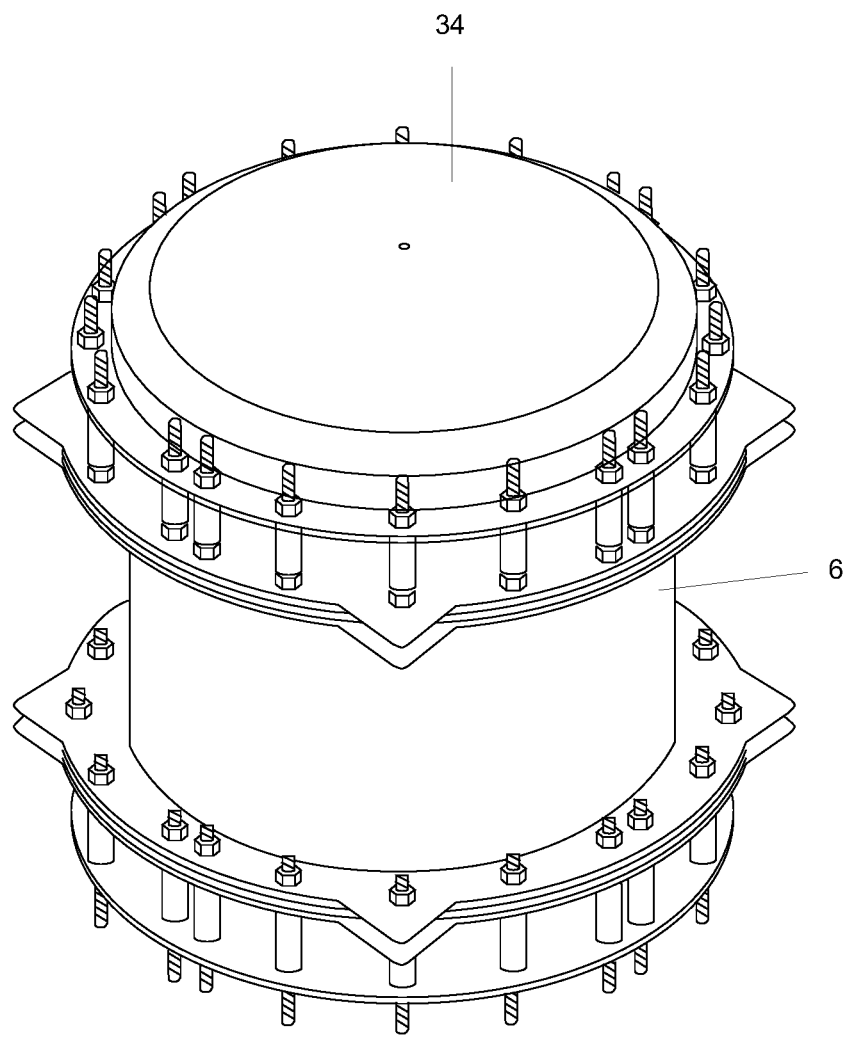
FIG. 21 shows a perspective view of the assemble shown in FIG. 19.
Figure 22:
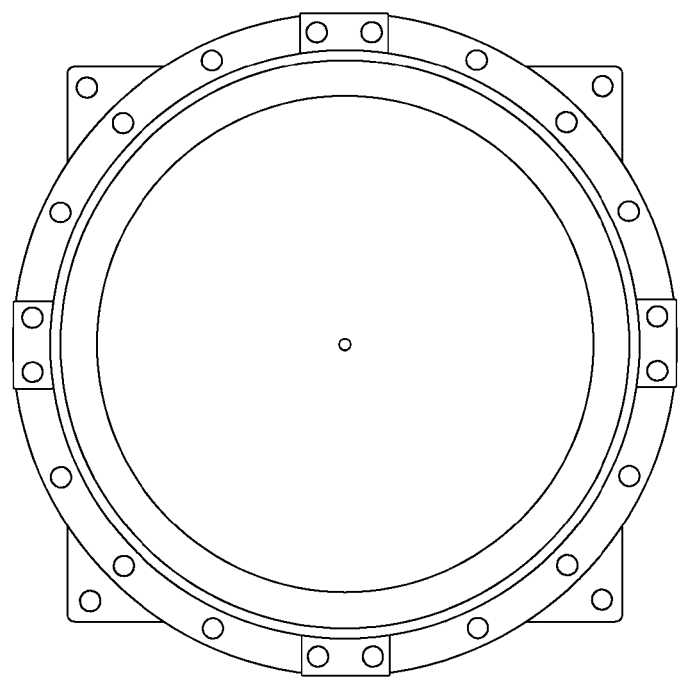
FIG. 22 shows a plane top view as seen from above of FIG. 19.
Figure 23:
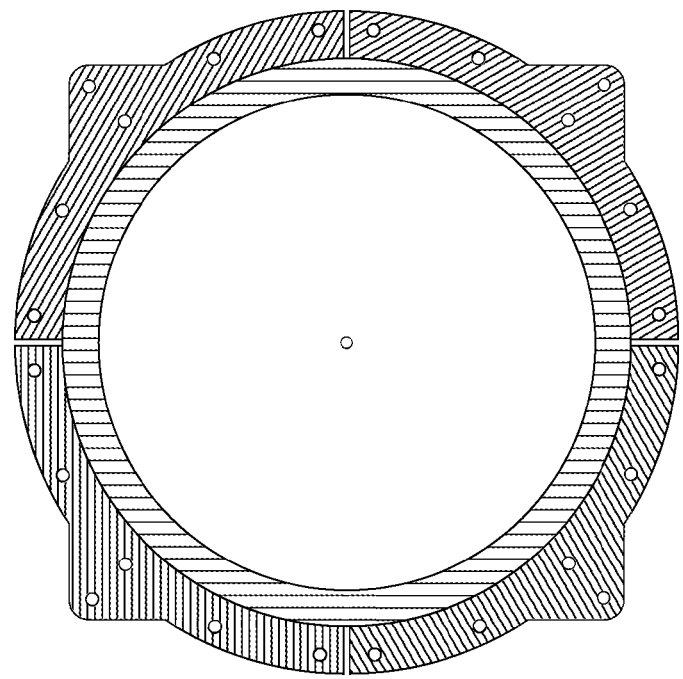
FIG. 23 shows a plane sectional view as seen along the sectional line B-B in FIG. 19.
Figure 24:
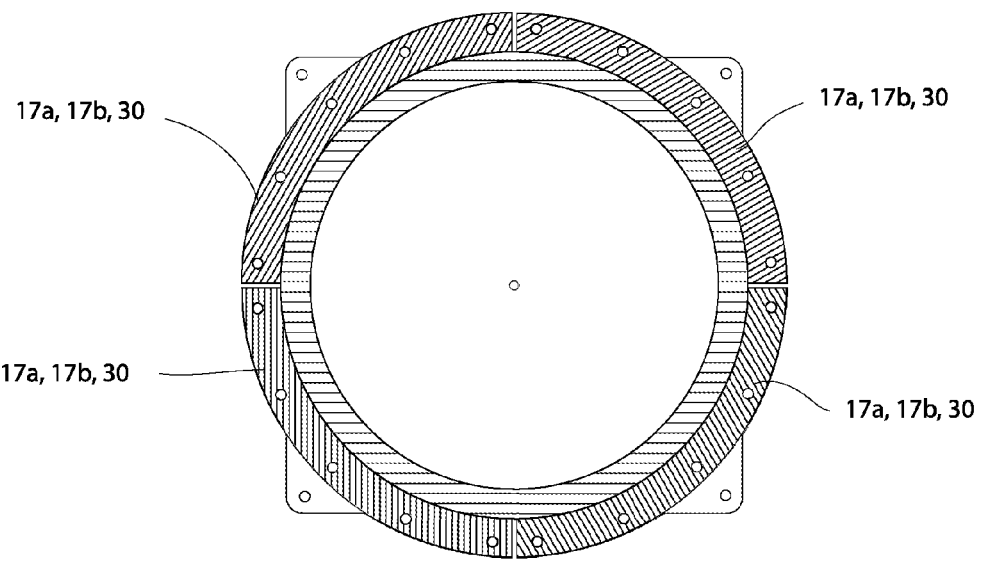
FIG. 24 shows a plane sectional view as seen along the sectional line D-D in FIG. 19.
Figure 25:
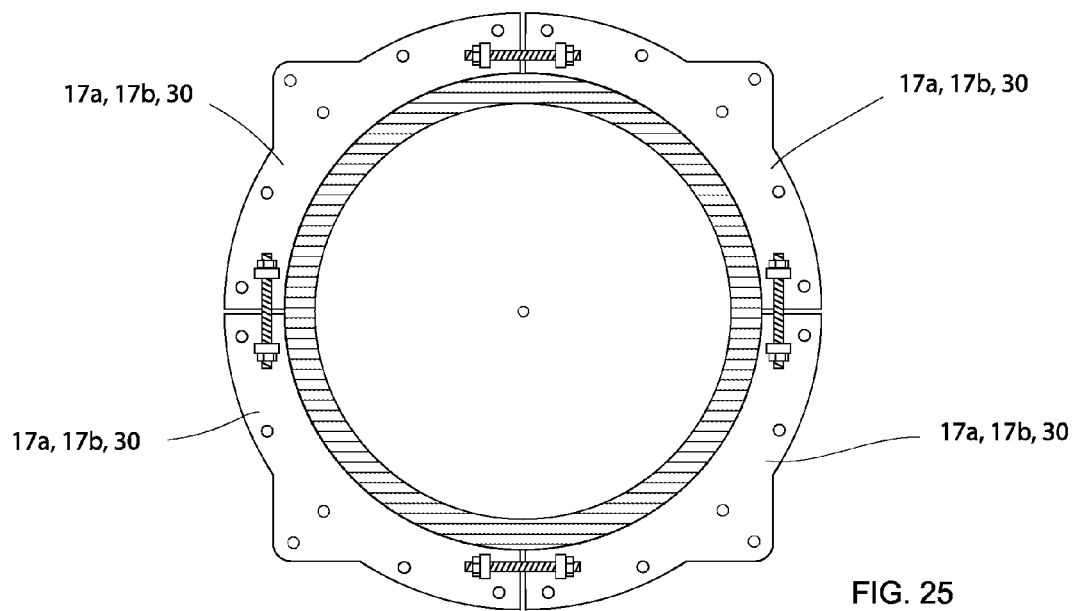
FIG. 25 shows a plane sectional view as seen along the sectional line E-E in FIG. 19.

FIGS. 16-18 show an embodiment of an assemble of a tube sample during the pressure test thereof, where use are made of squeezing parts 28 similar to them shown in FIGS. 11-15.

Figure 26:
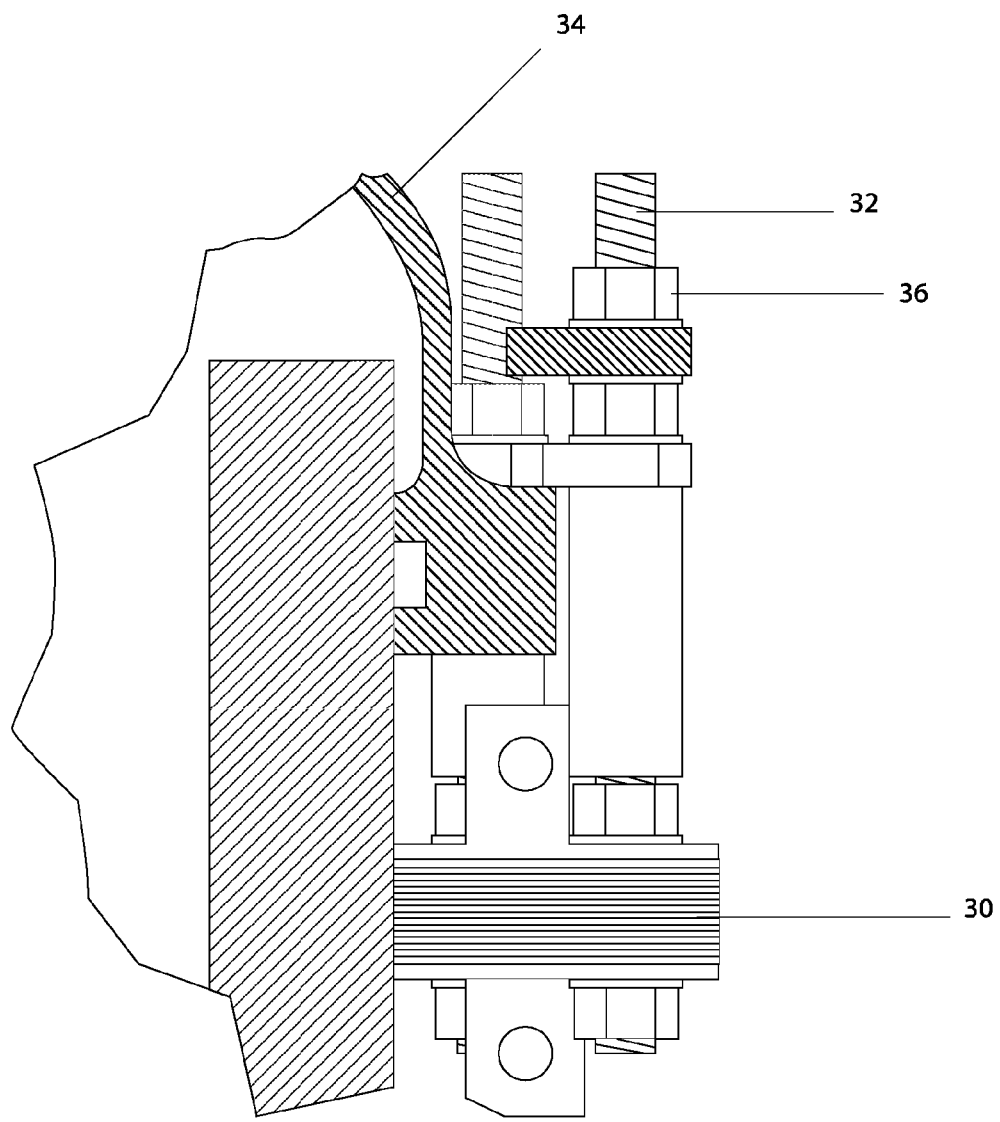
FIG. 26 shows a plane enlarged sectional view of the details in circle C of the upper right corner of FIG. 20.

FIGS. 19-26 show an modified embodiment of an assemble of a tube sample during the pressure test thereof, where the 45° squeezing parts 17a, 17b, 30 (shown separated from each other) are provided with external, axial extending bolts 32 used to connect and hold a dome-shaped end cap 34 in place in relation to already mounted squeezing parts 17a, 17b, 30 by means of simple mutters 36 (FIG. 26).

Figure 27:
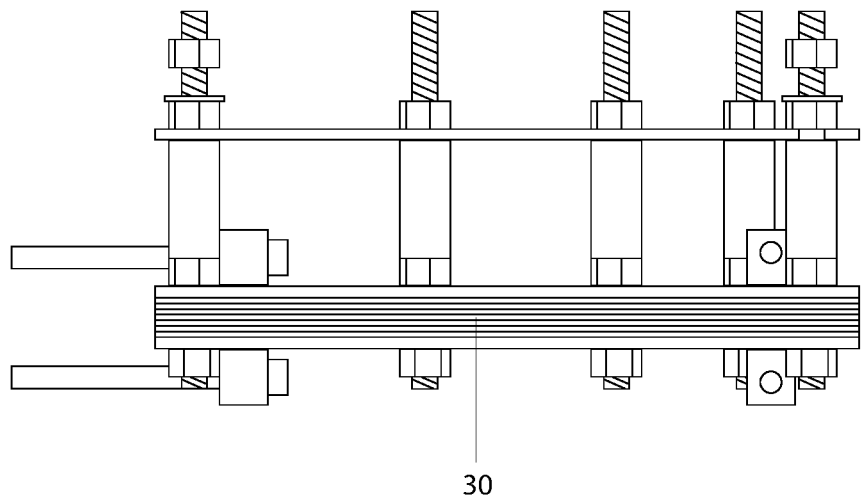
FIG. 27 shows a plane view of parts of an end closure device shown in FIGS. 19-21.
Figure 27:
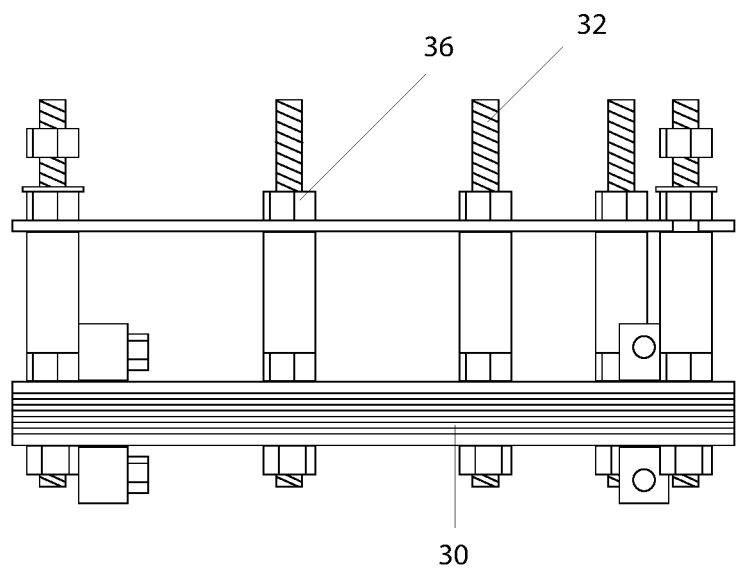
Figure 28:
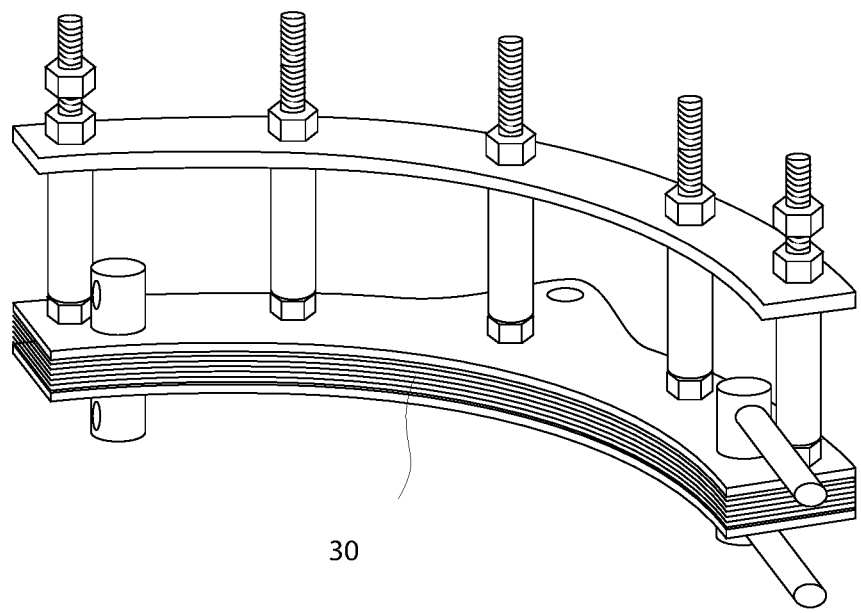
FIG. 28 shows a perspective view of a part of an end closure device similar to that of FIG. 27.
Figure 29:
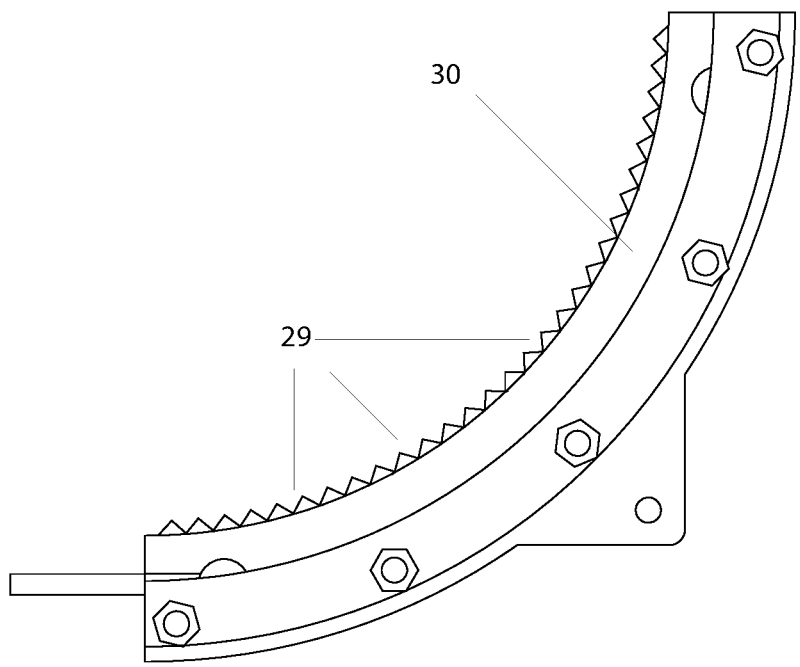
FIG. 29 shows a plane end view of the part of an end closure device shown in FIG. 28.

As seen more clearly in FIGS. 27-29 the 45° squeezing parts 30 are also at internal plate edges provided with tooth to ensure skid-proof contact with the outside wall of a tube sample.

Figure 30:
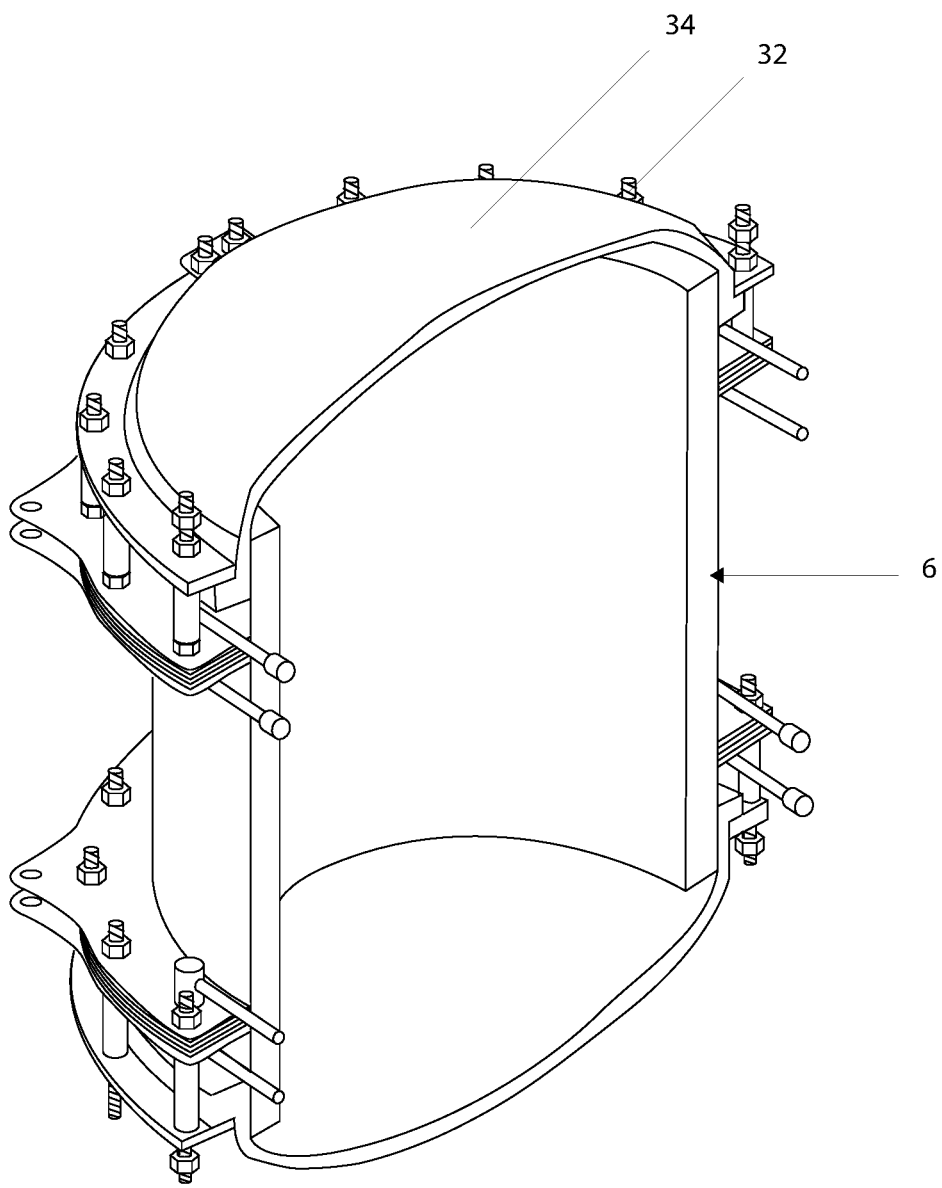
FIG. 30 shows a perspective sectional view cut through assemble of a tube sample and modified end closure devices according to the invention.
Figure 1:
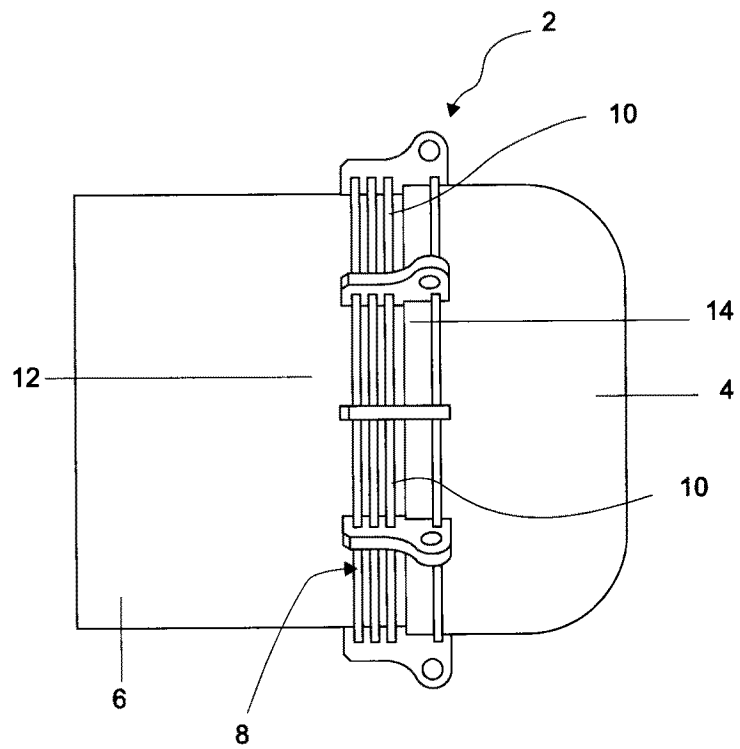
Figure 2:
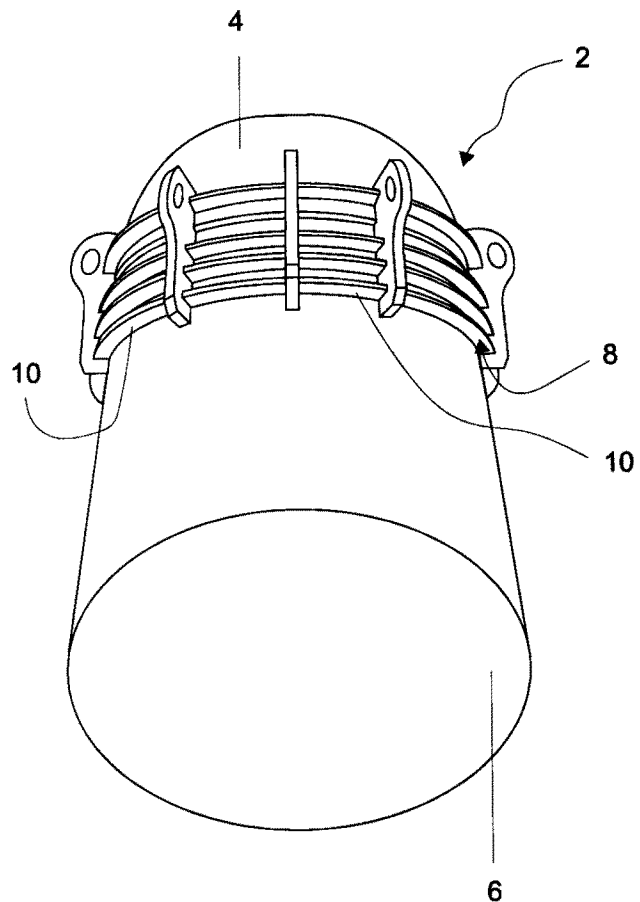
Figure 3:
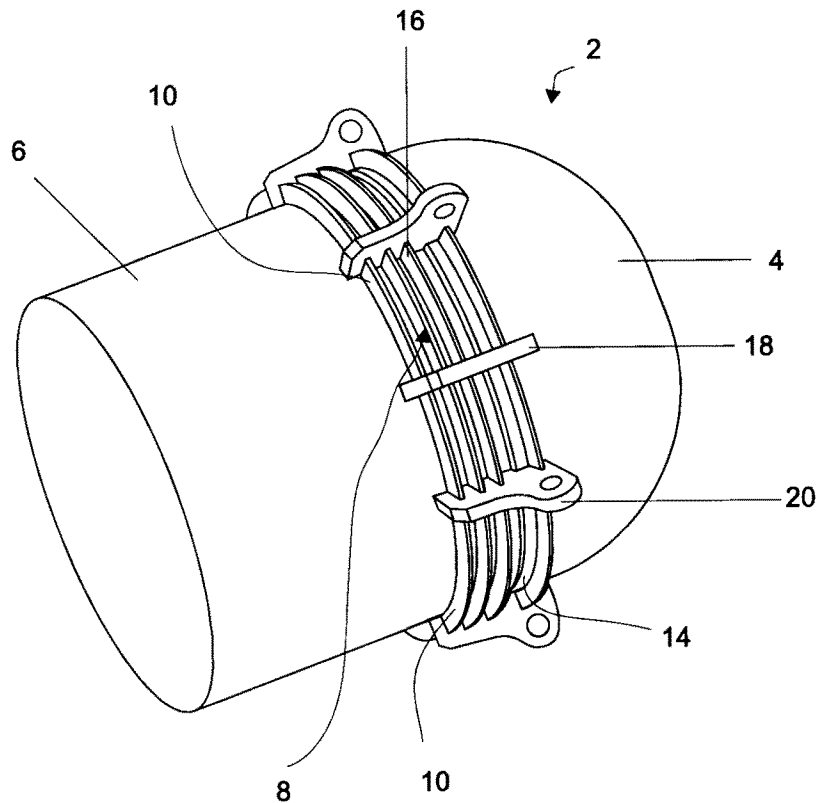
Figure 4:
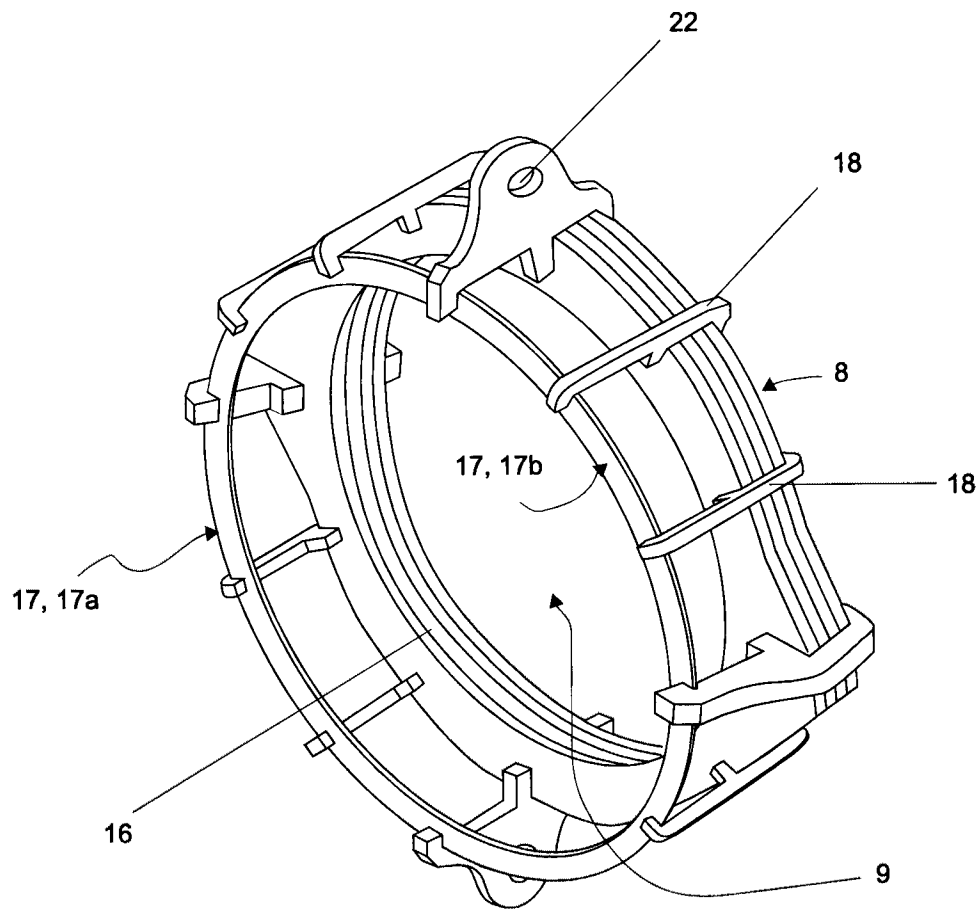
Figure 5:
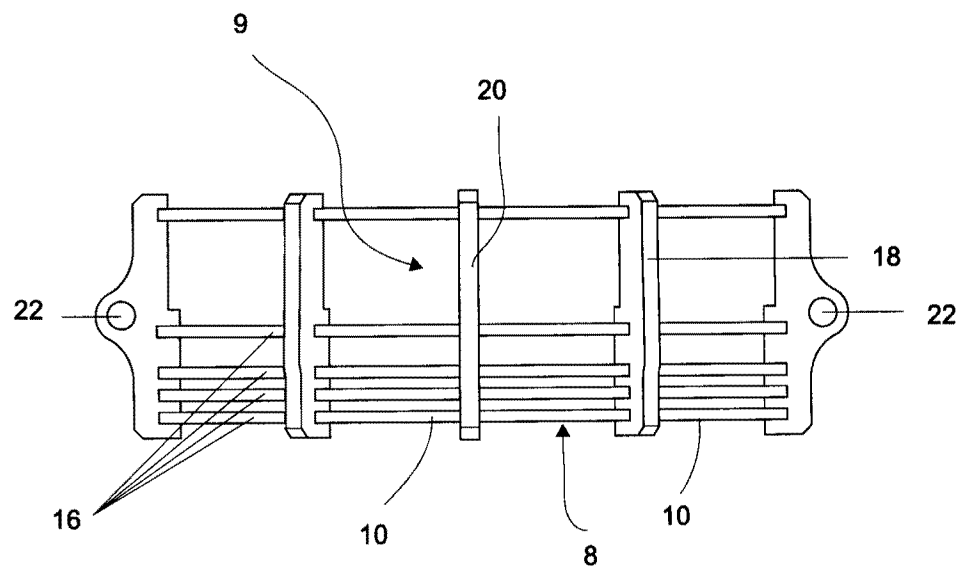
Figure 6:
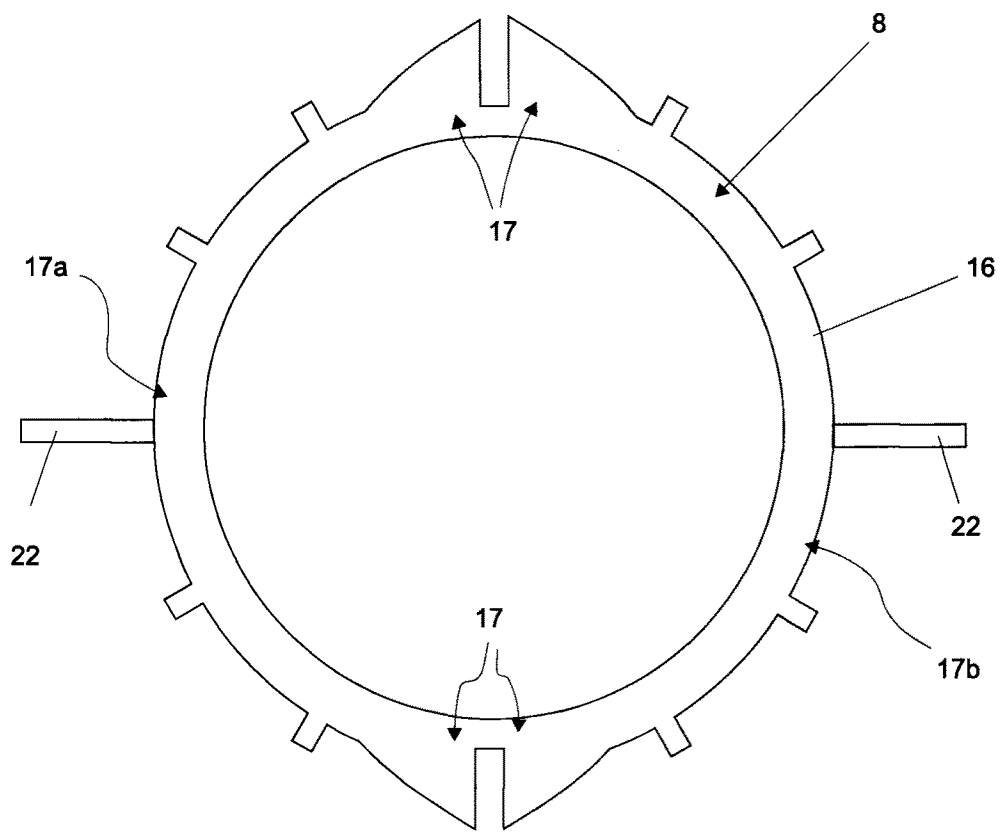
Figure 7:
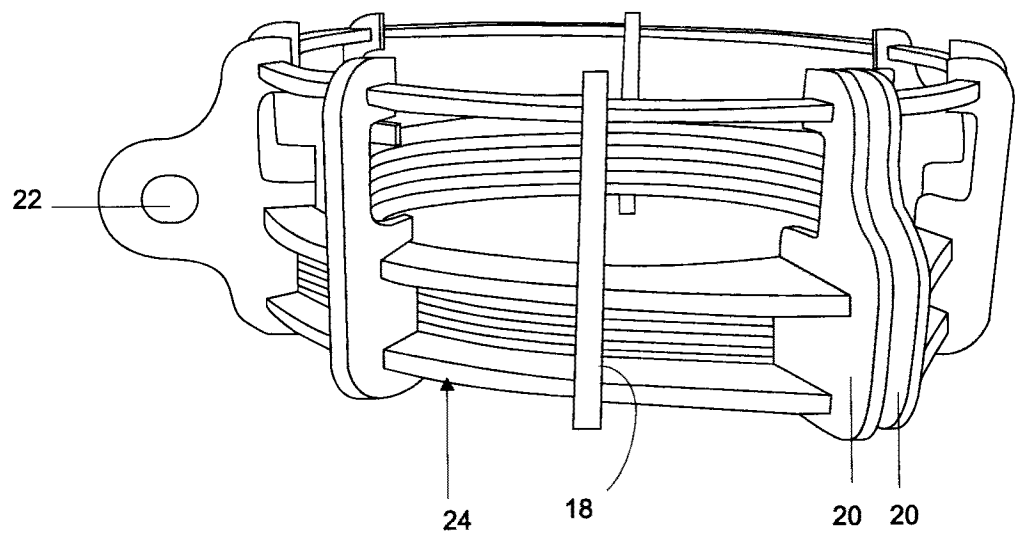
Figure 8:
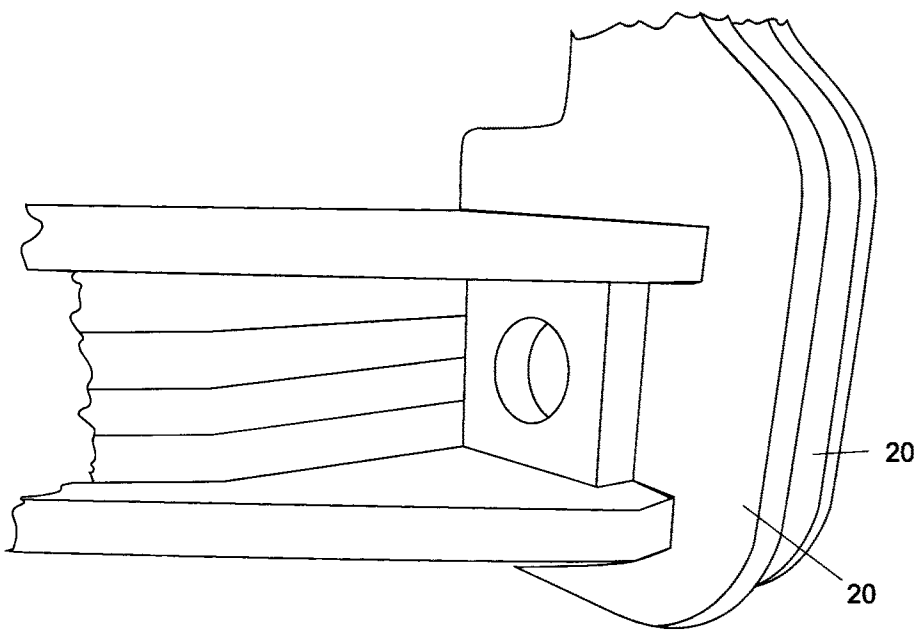
Figure 9:
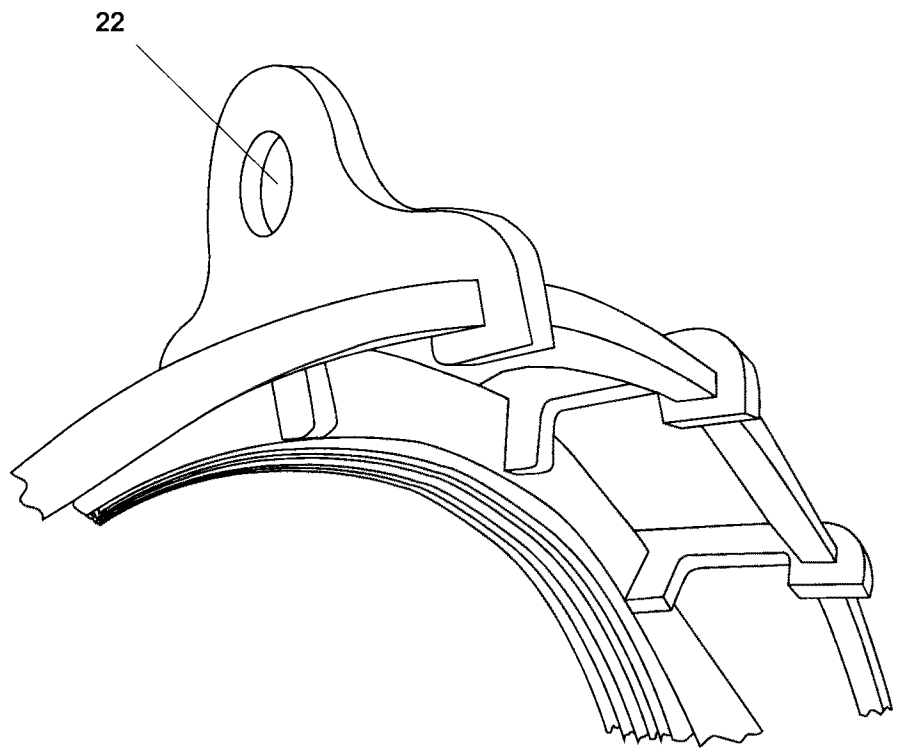
Figure 10:
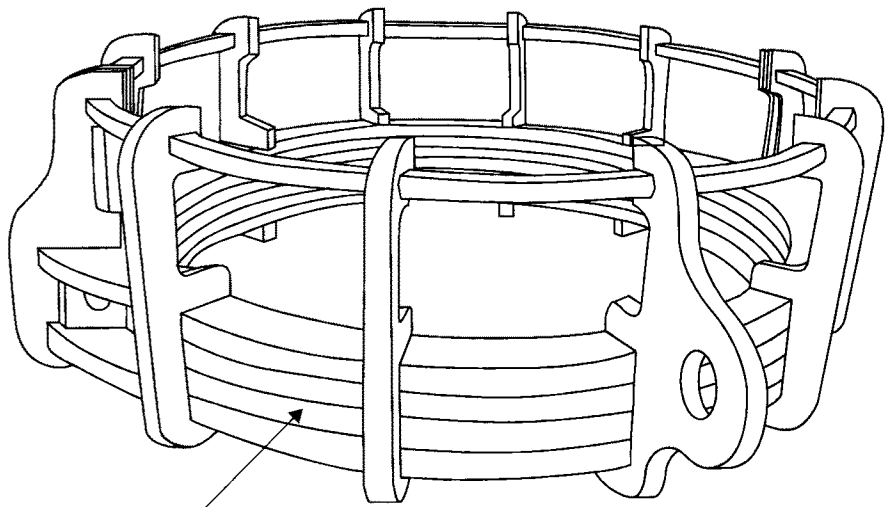
Figure 11:
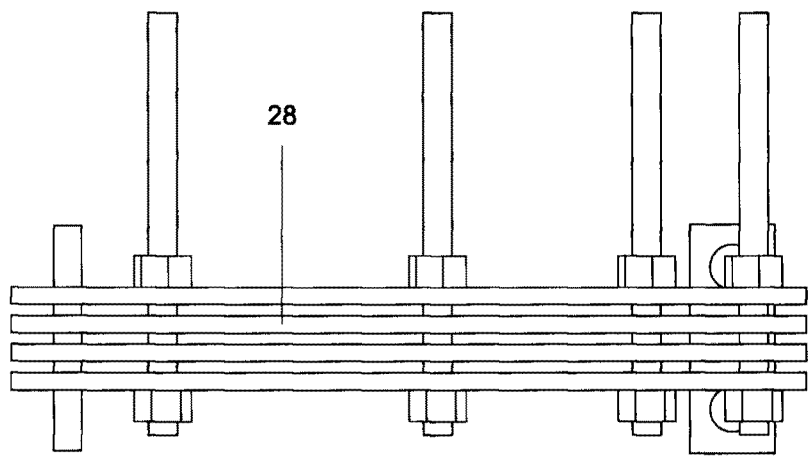
Figure 12:
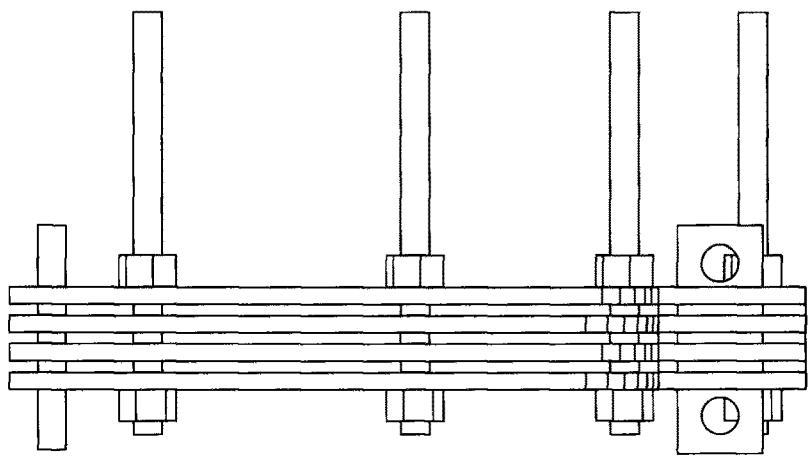
Figure 13:
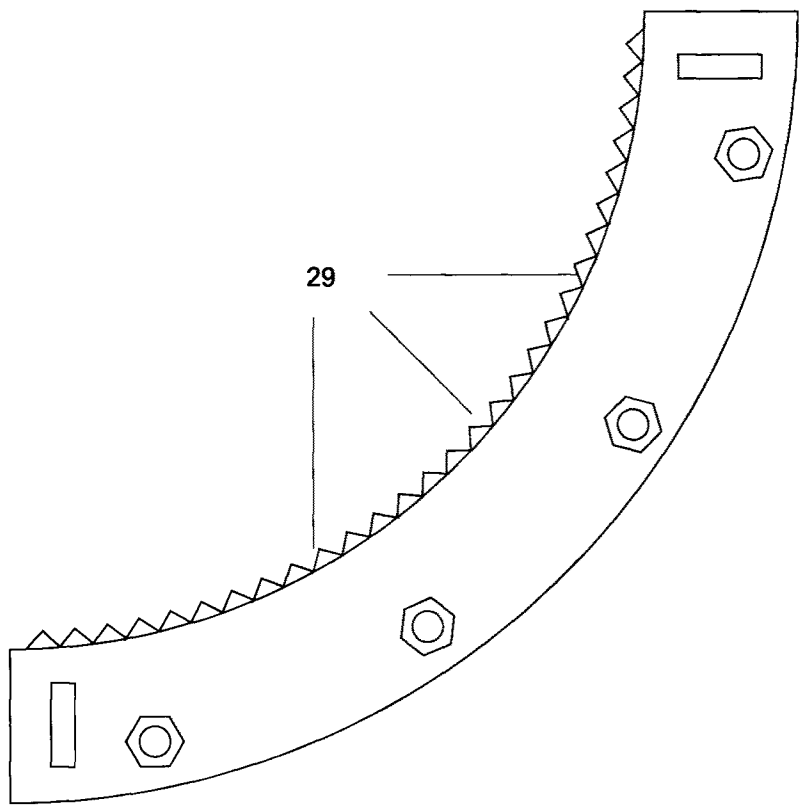
Figure 14:
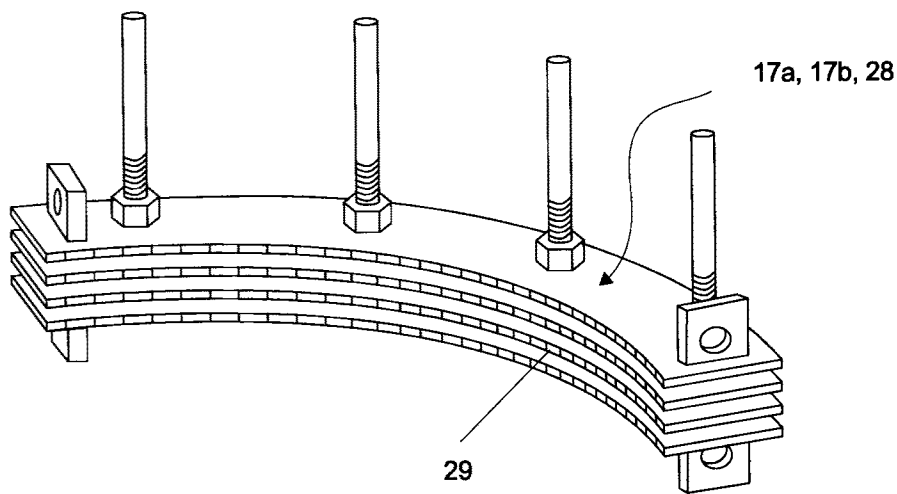
Figure 15:
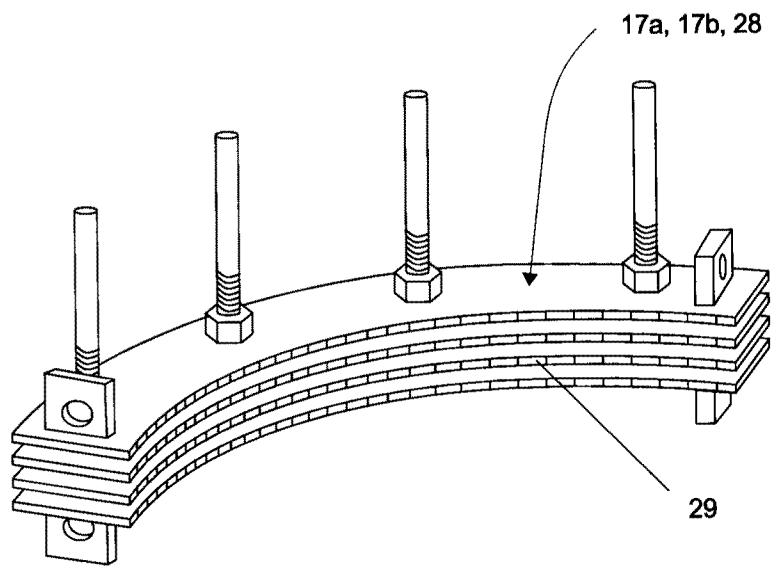
Figure 16:
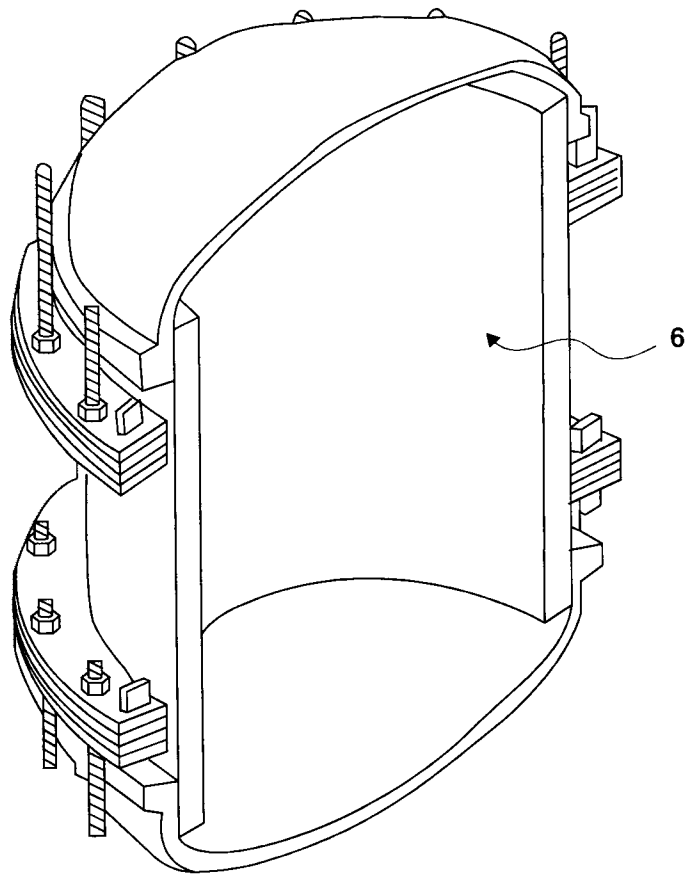
Figure 17:
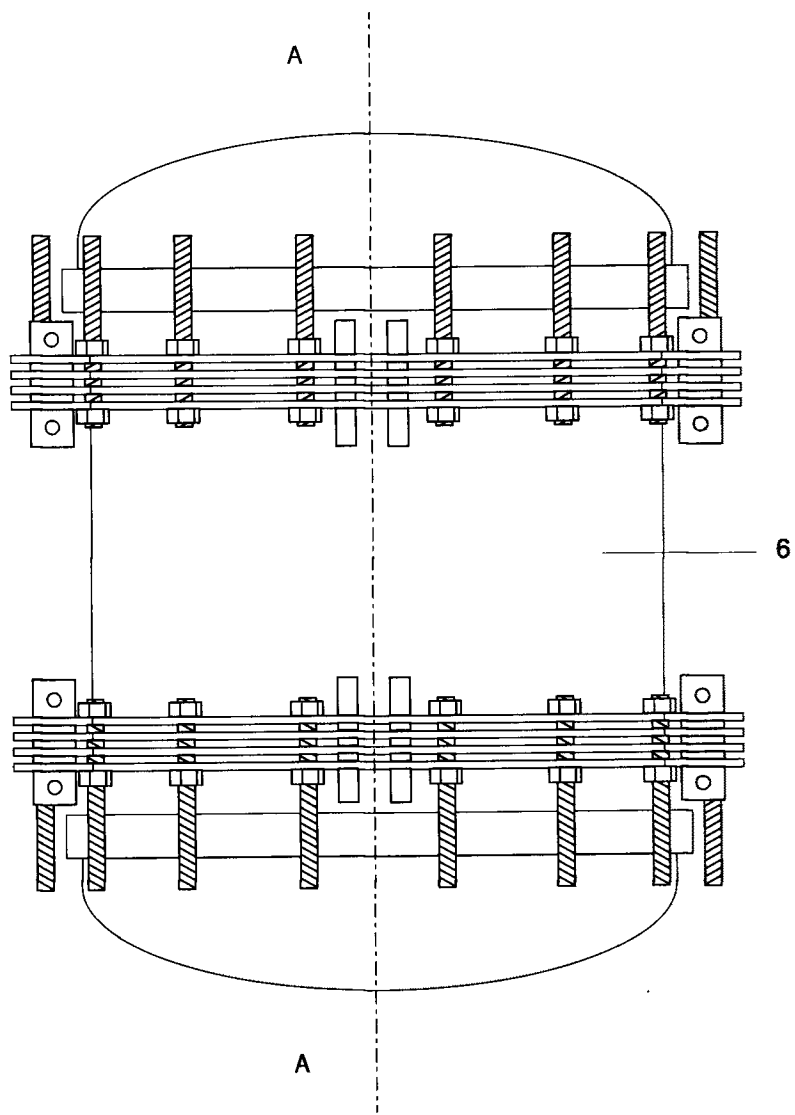
Figure 18:
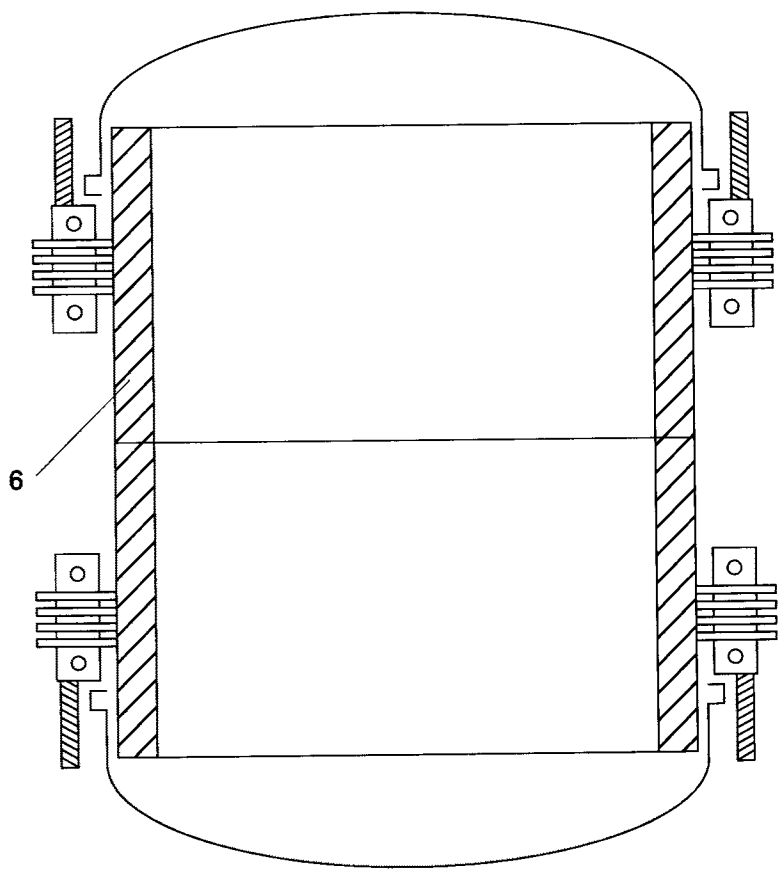
Figure 19:
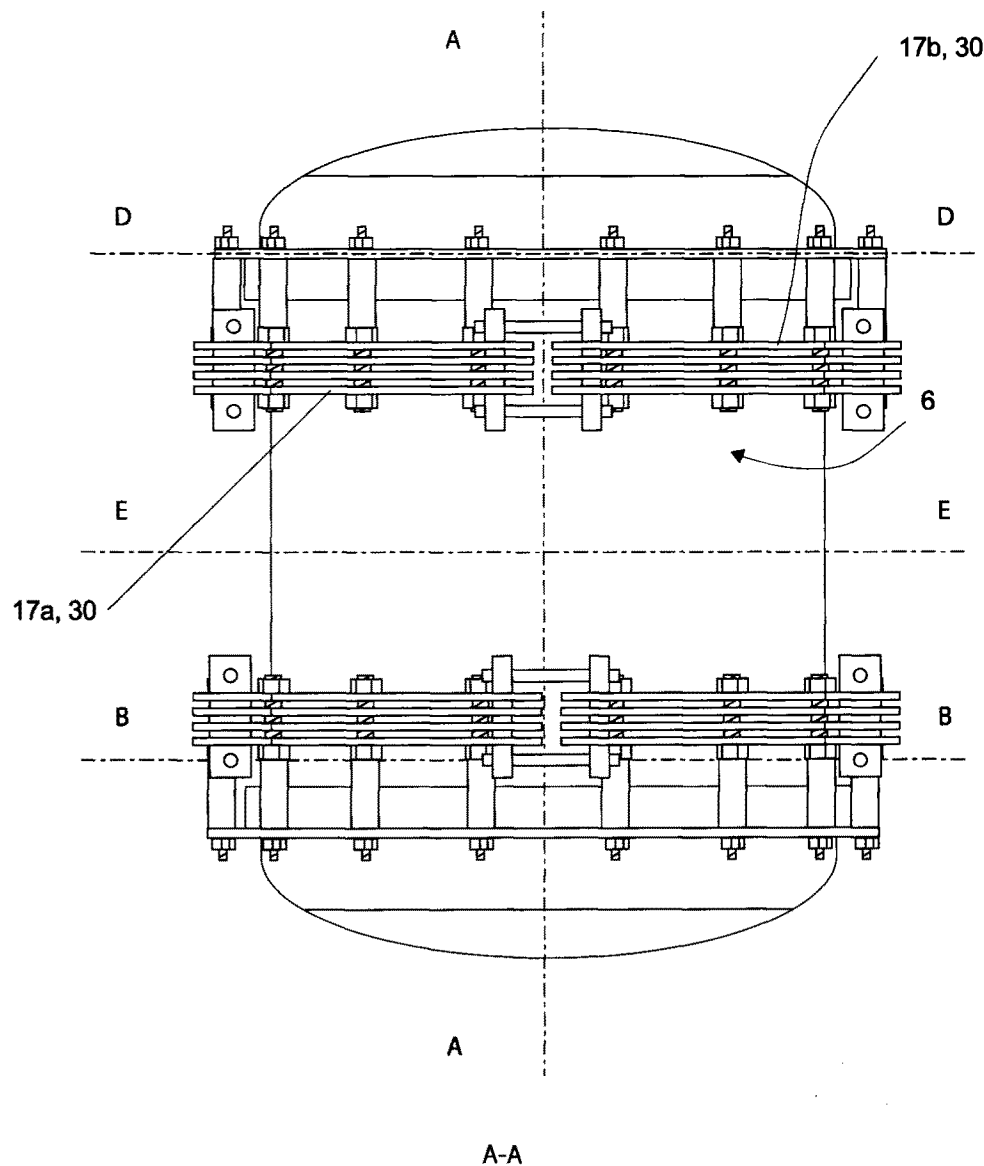
Figure 20:
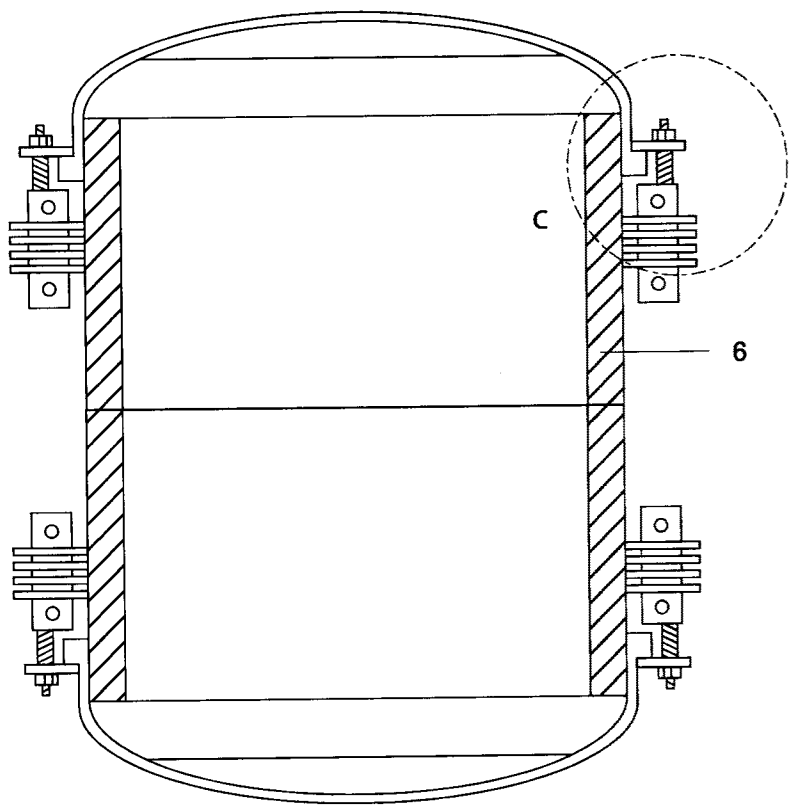
Figure 21:
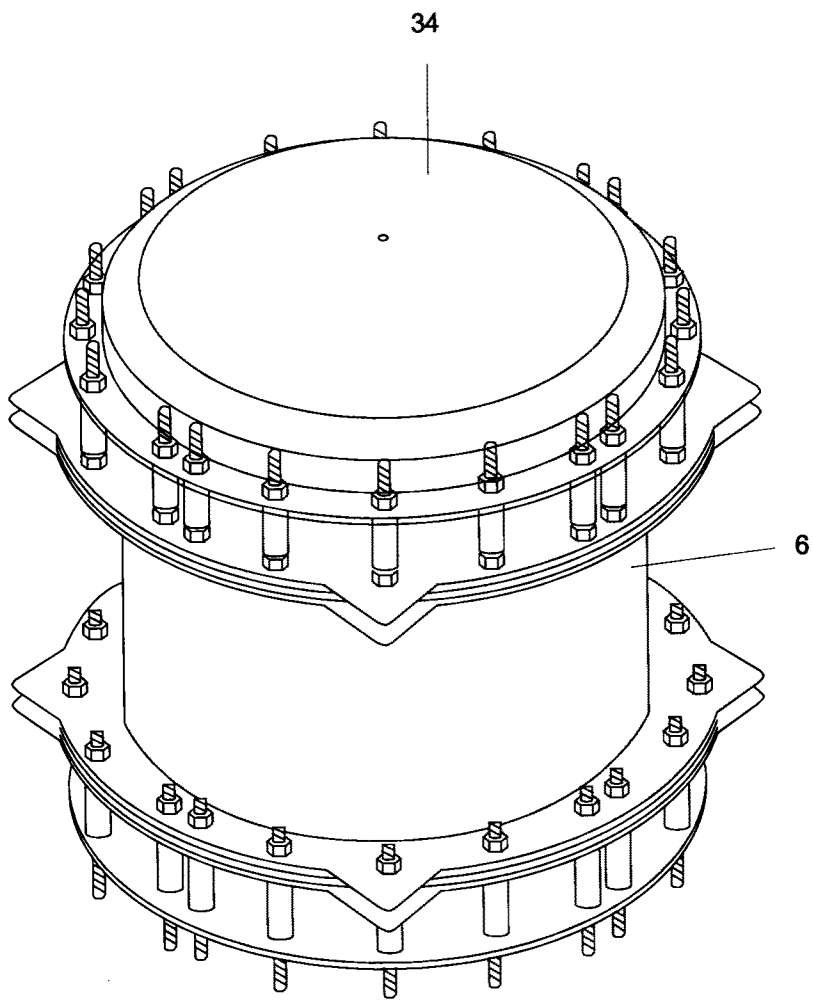
Figure 22:
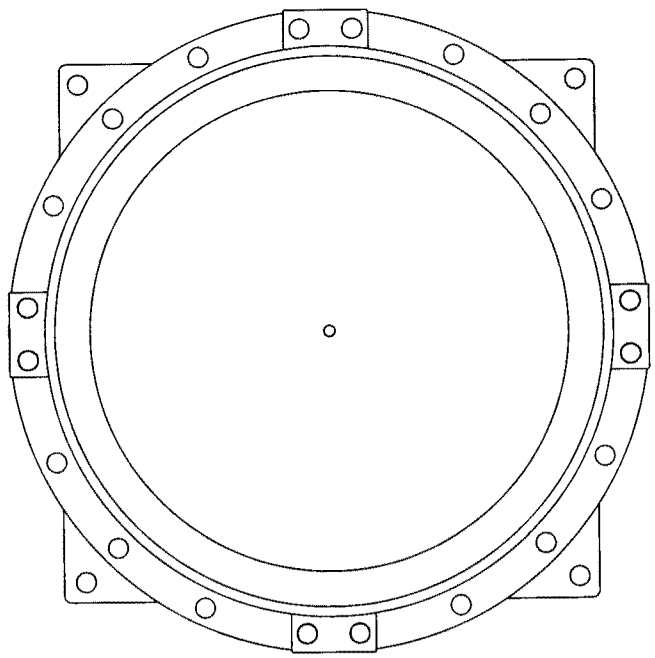
Figure 23:
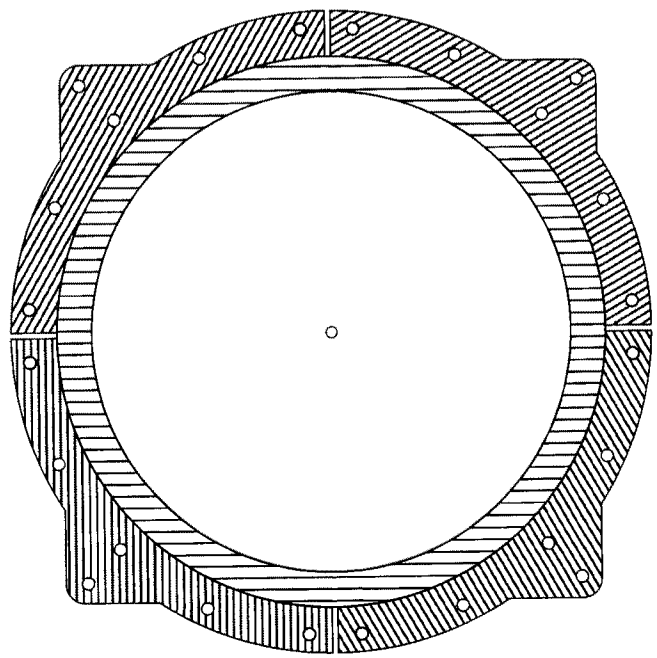
Figure 24:
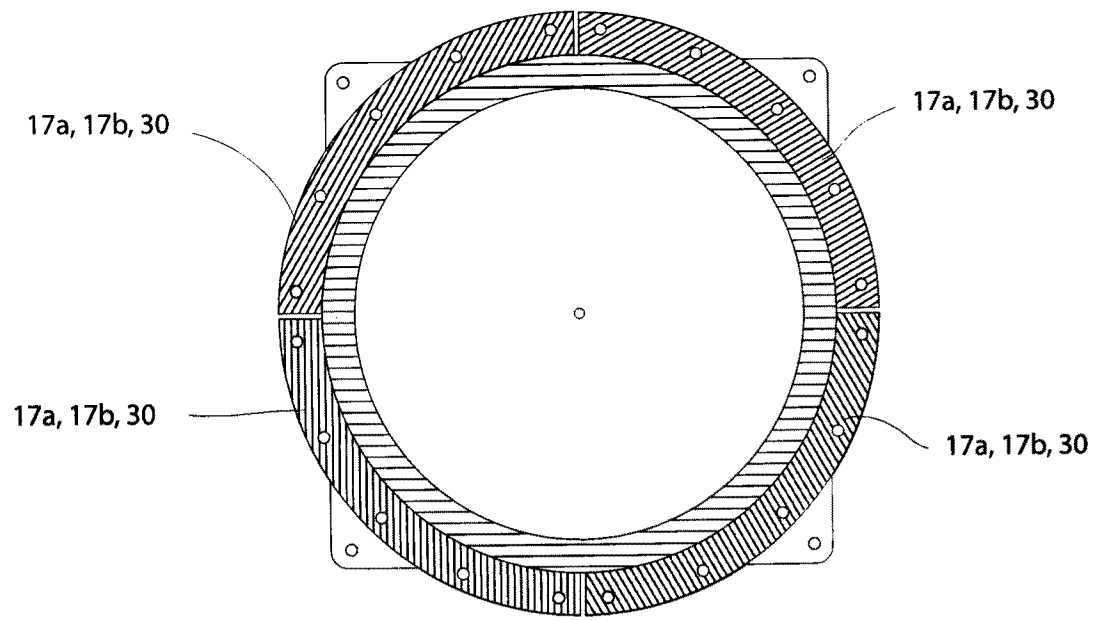
Figure 25:
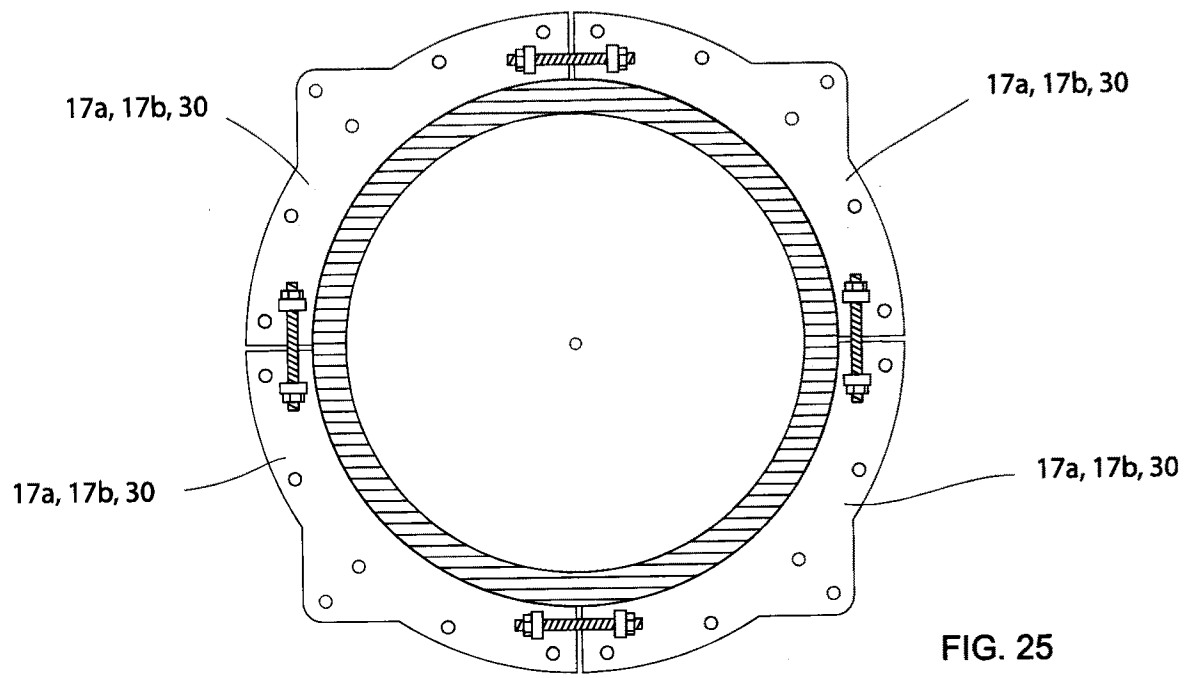
Figure 26:
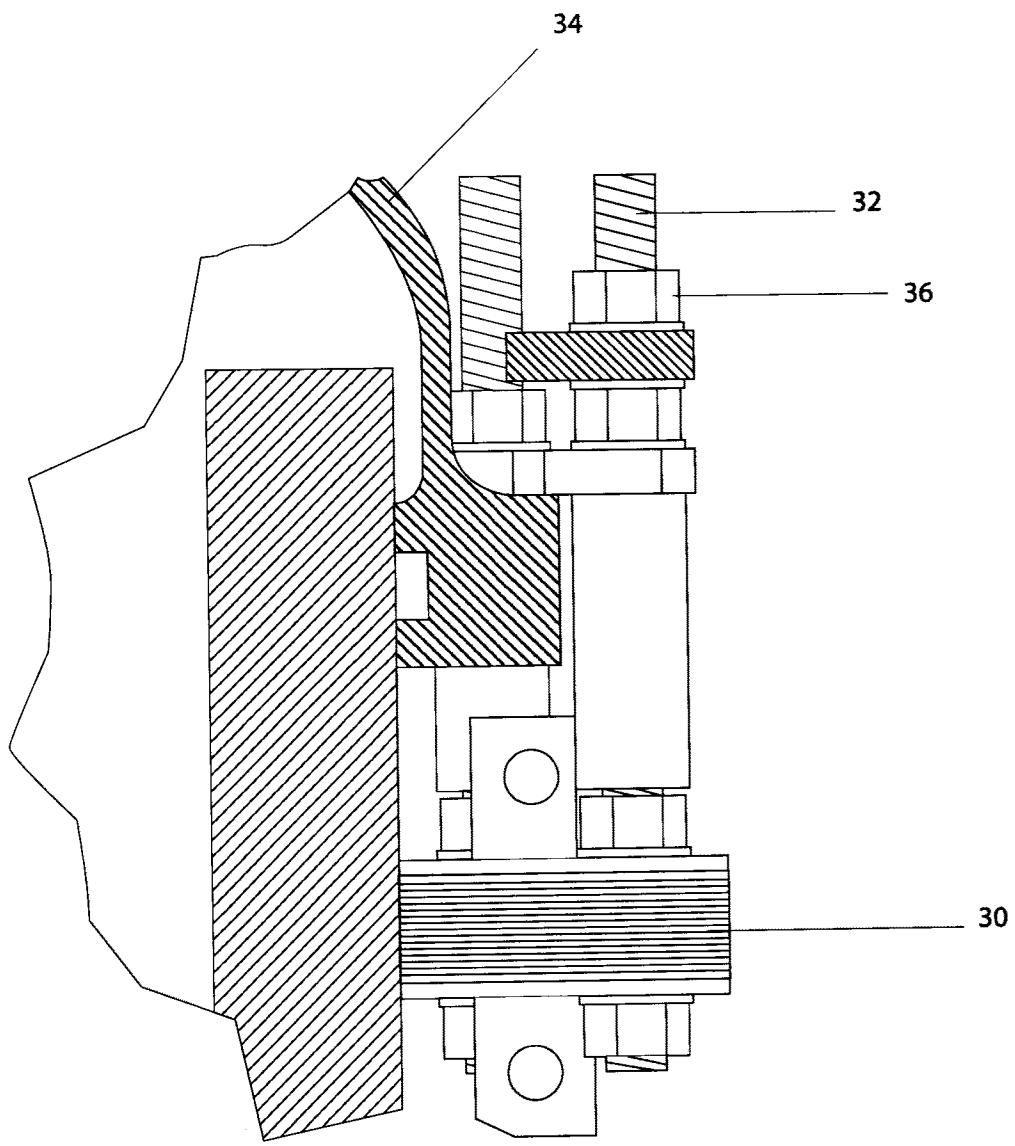
Figure 27:
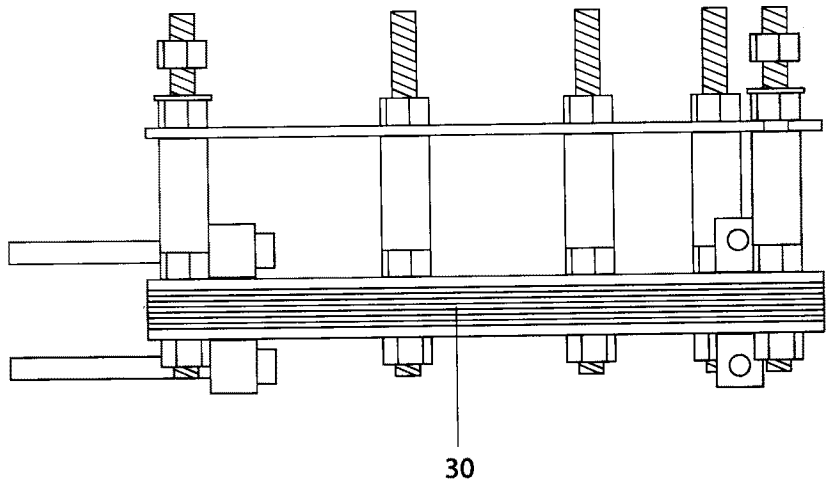
Figure 27:
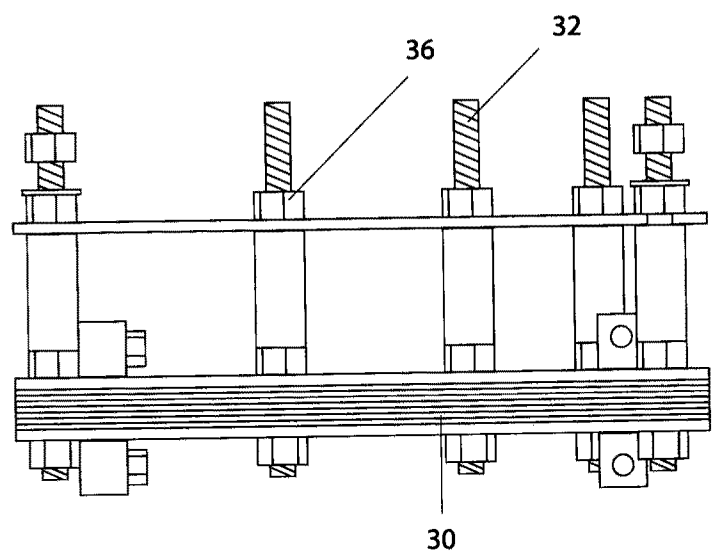
Figure 28:
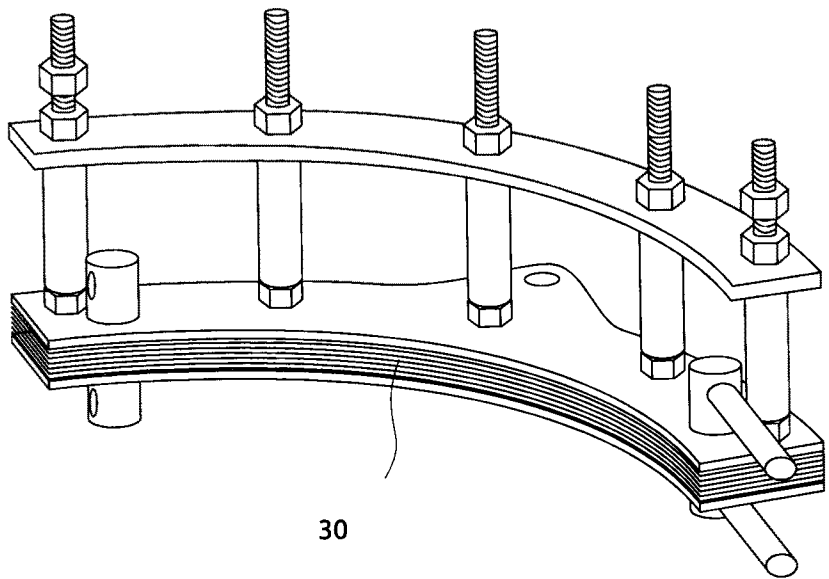
Figure 29:
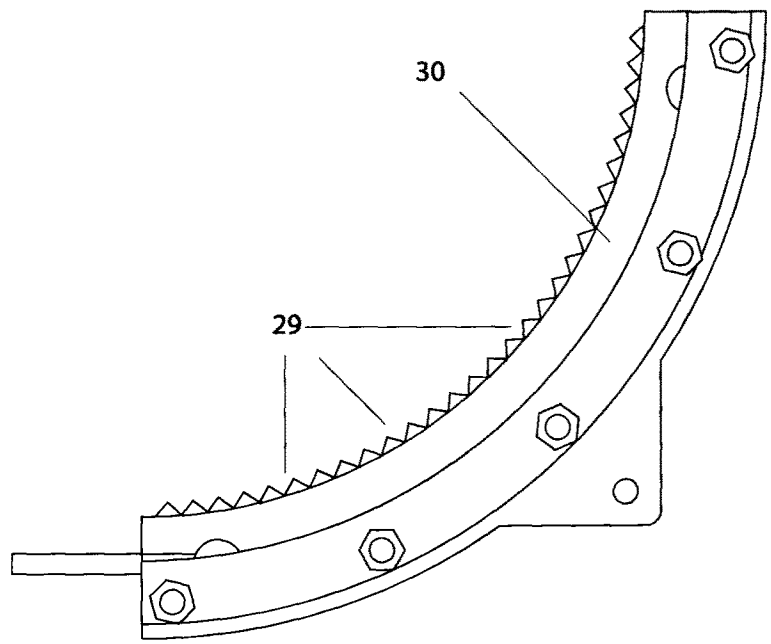
Figure 30:
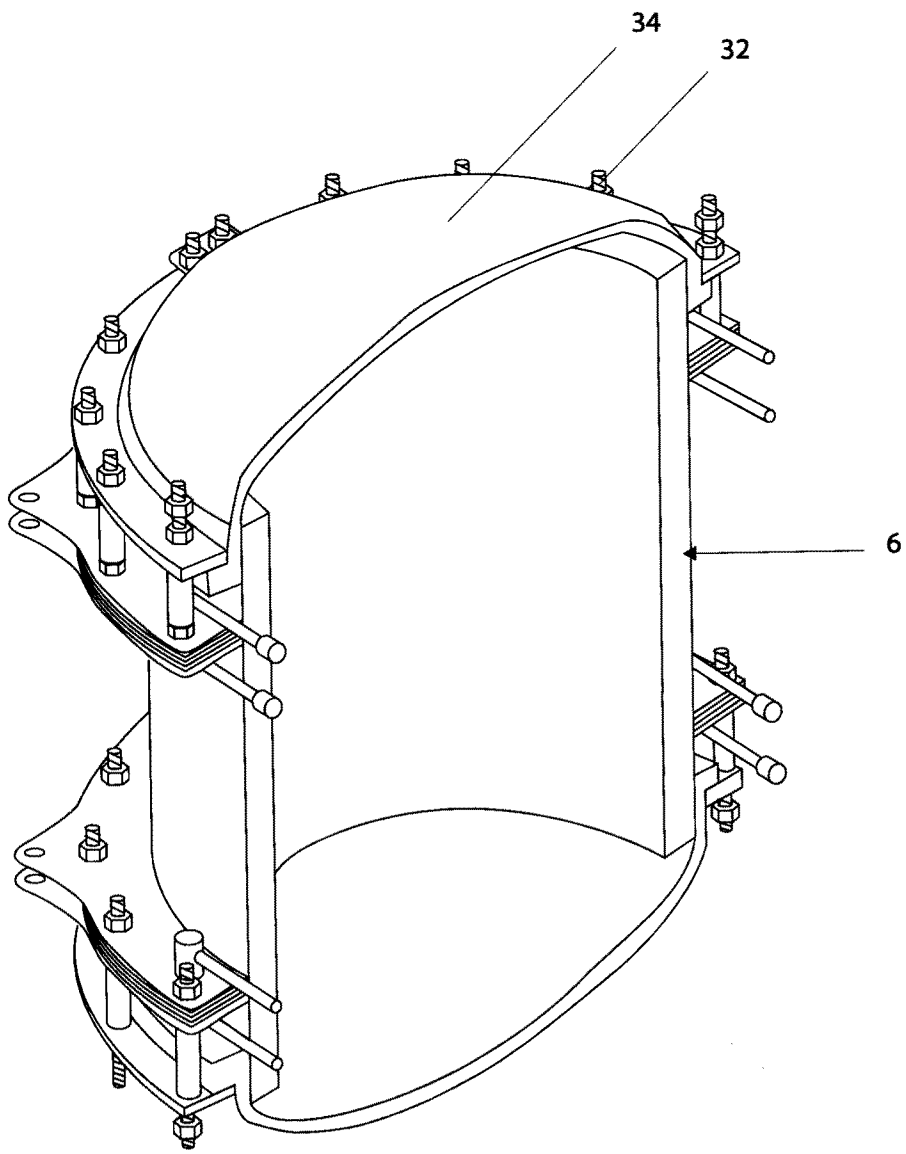

FIG. 30 shows a perspective sectional view through assemble of a tube sample during the pressure test thereof.

It shall be emphasized that the new and inventive principle according to the invention may be further modified with the main scope of the invention namely to provide for a more easily, quick and cheap production of end closure devices for use when testing polymer tubes.

In this connection it is indeed important that the very expensive combined end closures with integrated end caps made from solid moulded and milled aluminium bronze may be simply be substituted by an improved end closure according to the present invention, where at least the squeezing parts may be made from cheaper laser cut piled-up layers of plate material such as stainless steel, that is without the need of very expensive and time consuming milling operation.

By the concept of the present invention it becomes possible to vary both the internal configuration and the thickness of the piled-up plate members forming at least the squeezing parts of the end closure device. In other words it would be possible to built-up squeezing parts with any possible internal configuration without using milling tool operations or machining at all.

The invention claimed is:

1. An end closure device adapted to be used for internal hydro-static pressure testing of tubes, the end closure device comprising:
   an end cap comprising a dome shape and a sealing means for establishing a pressure-proof connection with an end part of a sample of one of the tubes to be tested, wherein the end cap comprises an exterior ring-shaped part; and
   at least one squeezing part configured to secure the end cap to the end part of the sample, wherein the at least one squeezing part is configured to be assembled around the exterior ring-shaped part of the end cap and around the end part of said sample of said tube to be tested,
   wherein said at least one squeezing part comprises a plurality of piled-up and interconnected plate elements,
   wherein one or more of the plate elements defines an opening configured to receive a portion of the end cap.

2. The end closure device of claim 1, wherein the one or more plate elements comprises one of: (a) a single, unitary plate element extending 360° to define the opening; or (b) a group of plate elements configured to be positioned together to collectively extend 360° to define the opening.

3. The end closure device of claim 1, comprising: (a) an external, radial connection means coupled to the plate elements; and (b) a plurality of connection rods extending through the plate elements to interconnect the plate elements to each other.

4. The end closure device claim 1, wherein said exterior ring-shaped part of said end cap is connected with the at least one squeezing part by means of external, radial connection means including additional plate elements.

5. The end closure device of claim 1, wherein said at least one squeezing part comprises axially extending connecting members configured to connect the end cap to the at least one squeezing part after the at least one squeezing part has been mounted around the end part of the sample of the tube to be tested.

6. The end closure device of claim 1, wherein at least one of the plate elements comprises an internal edge, the internal edge comprising at least one inwardly projecting tooth configured to ensure skid-proof connection between the at least one squeezing part and an outside wall of the sample.

7. The end closure device of claim 1, wherein:
   the sample defines a fluid passageway extending along an axis, wherein the plate elements form a stack which extends along the axis;
   a group of three of the plate elements are arranged together in a same plane;
   each of the plate elements extends through 120°; and
   the at least one squeezing part comprises three radial arranged assembling flanges.

8. The end closure device of claim 1, wherein:
   the sample defines a fluid passageway extending along an axis, wherein the plate elements form a stack which extends along the axis;
   a group of four of the plate elements are arranged together in a same plane;
   each of the plate elements extends through 90°; and
   the at least one squeezing part comprises four radial arranged assembling flanges.

9. The end closure device of claim 1, wherein:
   the sample defines a fluid passageway extending along an axis, wherein the plate elements form a stack which extends along the axis;
   a group of two of the plate elements are arranged together in a same plane;
   each of the plate elements extends through 180°; and
   the at least one squeezing part comprises two radial arranged assembling flanges.

10. The end closure device of claim 3, wherein each of said interconnected plate elements and said external, radial connection means includes a stainless steel plate.

11. An end closure device comprising:
    an end cap configured to seal an end of a tube to be pressure tested, the tube configured to extend along an axis while being pressure tested;
    at least one annular squeezing part configured to be coupled to the end cap, the at least one annular squeezing part configured to encircle the end of the tube when the tube is being pressure tested, the at least one annular squeezing part comprising a plurality of plate elements, the plate elements being stackable along the axis to form a plate stack; and
    at least one rod which couples the plate elements together,
    wherein one or more of the plate elements defines an opening configured to receive a portion of the end cap; and
    wherein the one or more of the plate elements is configured to squeeze the portion to secure the end cap onto the end of the tube.

12. The end closure device of claim 11, wherein the one or more plate elements comprises one of: (a) a single, unitary plate element extending 360° to define the opening; or (b) a group of plate elements configured to be positioned together to collectively extend 360° to define the opening.

13. The end closure device of claim 11, wherein the end cap comprises a seal member.

14. The end closure device of claim 11, wherein, when the annular squeezing part is coupled to the end cap:
    one or more of the plate elements of the plate stack is configured to encircle and engage the portion of the end cap; and
    one or more of the plate elements within the plate stack are configured to encircle and engage an exterior surface of the tube.

15. The end closure device of claim 14, wherein at least one of the plate elements comprises a tooth configured to engage an outer wall of the tube.

16. An end closure device comprising:
    a cap configured to seal an end of a tube to be pressure-tested, the tube comprising a wall configured to extend along an axis, the cap comprising an end portion and a collar portion;
    at least one squeezer configured to be coupled to the cap, the at least one squeezer comprising:
    a first ring comprising a first perimeter defining a first opening configured to receive the collar portion; and a second ring comprising a second perimeter defining a second opening configured to receive the wall, the second ring comprising at least one tooth configured to engage the wall; and at least one coupler configured to fixedly couple the first perimeter to the second perimeter, wherein the at least one coupler is configured to:

extend along the axis;

inhibit movement of the first ring relative to the second ring;

position the first and second rings about a common center; and maintain the first and second rings at different positions relative to the axis.

17. The end closure device of claim 16, wherein the end portion of the cap comprises a dome-shape interior surface and a dome-shaped exterior surface.

18. The end closure device of claim 16, wherein the at least one coupler is configured to arrange the first and second rings in a stack configuration, wherein a first surface of the first ring lies over a second surface of the second ring when the cap is oriented so that the first ring is above the second ring.

19. The end closure device of claim 16, wherein:

the at least one coupler is configured to be coupled to the first and second rings without extending into the second opening;

the first ring comprises one or more first plate elements extending in a same first plane;

the second ring comprises one or more second plate elements extending in a same second plane; and the first and second planes are spaced apart along the axis.

20. The end closure device of claim 16, wherein:

the at least one squeezer comprises a third ring comprising a third perimeter defining a third opening configured to receive the wall, the third ring comprising at least one other tooth configured to engage the wall;

the at least one coupler is configured to fixedly couple the first perimeter to the second and third perimeters, wherein the at least one coupler is configured to:
(a) inhibit movement of the first ring relative to the second and third rings;
(b) position the first, second and third rings about a common center; and
(c) maintain the first, second and third rings at different positions relative to the axis;

the at least one coupler comprises:
(a) a first portion comprising a first mouth configured to receive a first portion of the first ring; and
(b) a second portion comprising a second mouth configured to receive:
(i) a second portion of the second ring; and
(ii) a third portion of the third ring;

each one of the first, second and third rings comprises a plate shape; and the at least one coupler is configured to be coupled to the first, second and third rings without extending into either one of the second and third openings.

* * * * *

UNITED STATES PATENT AND TRADEMARK OFFICE
CERTIFICATE OF CORRECTION

| | |
|---|---|
| PATENT NO. | : 9,599,270 B2 |
| APPLICATION NO. | : 14/376895 |
| DATED | : March 21, 2017 |
| INVENTOR(S) | : Peter Sejer et al. |

It is certified that error appears in the above-identified patent and that said Letters Patent is hereby corrected as shown below:

Delete the title page and substitute therefore with the attached title page consisting of the corrected illustrative figure(s).

Delete Page 2 and substitute therefore with the attached Page 2 showing the corrected number of drawing sheets.

Delete Drawing Sheets 1-22 and substitute therefore with the attached Drawing Sheets 1-28 in which FIGS. 1-30 are being replaced with FIGS. 1-30 as shown on the attached pages.

Signed and Sealed this
Fourth Day of December, 2018

Andrei Iancu
*Director of the United States Patent and Trademark Office*

(12) United States Patent
Sejer et al.

(10) Patent No.: US 9,599,270 B2
(45) Date of Patent: Mar. 21, 2017

(54) END CLOSURE DEVICE

(71) Applicant: SCITEQ A/S, Hinnerup (DK)

(72) Inventors: Peter Sejer, Risskov (DK); Jesper Didriksen, Randers NØ (DK); René Kristensen, Hinnerup (DK)

(73) Assignee: SCITEQ A/S, Hinnerup (DK)

(*) Notice: Subject to any disclaimer, the term of this patent is extended or adjusted under 35 U.S.C. 154(b) by 106 days.

(21) Appl. No.: 14/376,895

(22) PCT Filed: Feb. 6, 2013

(86) PCT No.: PCT/DK2013/050030
§ 371 (c)(1),
(2) Date: Aug. 6, 2014

(87) PCT Pub. No.: WO2013/117195
PCT Pub. Date: Aug. 15, 2013

(65) Prior Publication Data
US 2015/0000779 A1    Jan. 1, 2015

(30) Foreign Application Priority Data
Feb. 6, 2012 (DK) .................... PA 2012 70057

(51) Int. Cl.
*F16L 55/10*    (2006.01)
*F16L 57/00*    (2006.01)
(Continued)

(52) U.S. Cl.
CPC .......... *F16L 55/115* (2013.01); *F16L 23/032* (2013.01); *F16L 23/036* (2013.01); *F16L 55/1157* (2013.01)

(58) Field of Classification Search
USPC .................................... 138/90, 96 R
See application file for complete search history.

(56) References Cited

U.S. PATENT DOCUMENTS

| | | | |
|---|---|---|---|
| 1,593,041 A | 7/1926 | Stewart | |
| 2,166,412 A | 7/1939 | Kiesel | |
| (Continued) | | | |

FOREIGN PATENT DOCUMENTS

| | | |
|---|---|---|
| DE | 38 33 535 A1 | 4/1990 |
| FR | 2 859 009 A1 | 2/2005 |
| WO | WO 2010/034823 A1 | 4/2010 |

OTHER PUBLICATIONS

EPO, International Search Report for International Application No. PCT/DK2013/050030, completed Apr. 12, 2013.
(Continued)

*Primary Examiner* — Paul R Durand
*Assistant Examiner* — Vishal Pancholi
(74) *Attorney, Agent, or Firm* — Barclay Damon, LLP

(57) ABSTRACT

An end closure device (2) adapted to be used in connection with internal hydrostatic pressure testing of polymer tubes and comprising a mainly dome-shaped end cap (4) provided with sealing means for establishing a pressure-proof connection with opposite end parts of a sample (6) of the tube to be tested, an exterior ring-shaped part (14) of said dome-shaped end cap (4) being adapted to be connected with at least one or more squeezing parts (10) adapted to be assembled around said opposite end parts of said sample (6) of said tube to be tested, where said one or more squeezing parts (10) each being built-up of a number of piled up and interconnected plate elements (16) the configuration of each of which being provided by a cutting operation such as laser cutting or water cutting. By the concept of the present invention it becomes possible to vary both the internal configuration and the thickness of the piled-up plate members forming at least the squeezing parts of the end closure device. In other words it would be possible to built-up
(Continued)

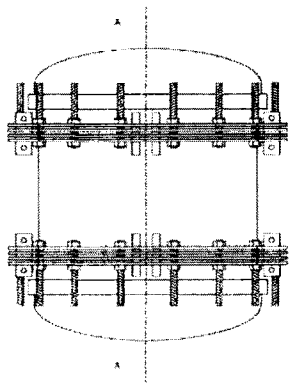

squeezing parts with any possible internal configuration without using milling tool operations or machining at all.

20 Claims, 28 Drawing Sheets

(51) Int. Cl.
    *F16L 55/115*     (2006.01)
    *F16L 23/032*     (2006.01)
    *F16L 23/036*     (2006.01)

(56) References Cited

U.S. PATENT DOCUMENTS

| | | |
|---|---|---|
| 4,077,250 A | 3/1978 | Wesch |
| 4,237,936 A * | 12/1980 | Lollis .................. G01M 3/005 138/90 |
| 5,074,336 A | 12/1991 | Black |
| 5,468,025 A | 11/1995 | Adinolfe et al. |
| 7,134,454 B2 * | 11/2006 | Montminy .......... F16L 55/1157 138/89 |
| 2008/0092977 A1 * | 4/2008 | Zeyfang ................ F16L 55/115 138/96 R |
| 2008/0093847 A1 | 4/2008 | Sundholm |
| 2011/0011480 A1 * | 1/2011 | Vachon ............... F16L 55/1157 138/89 |

OTHER PUBLICATIONS

EPO (ISA/EP) Written Opinion of the International Searching Authority for International Application No. PCT/DK2013/050030.

* cited by examiner

A-A

A-A

30